US012370496B2

United States Patent
Taniguchi

(10) Patent No.: US 12,370,496 B2
(45) Date of Patent: Jul. 29, 2025

(54) HOLLOW FIBER MEMBRANE MODULE AND MANUFACTURING METHOD THEREFOR

(71) Applicant: ASAHI KASEI KABUSHIKI KAISHA, Tokyo (JP)

(72) Inventor: Tohru Taniguchi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 481 days.

(21) Appl. No.: 17/757,313

(22) PCT Filed: Dec. 17, 2020

(86) PCT No.: PCT/JP2020/047160
§ 371 (c)(1),
(2) Date: Jun. 14, 2022

(87) PCT Pub. No.: WO2021/125266
PCT Pub. Date: Jun. 24, 2021

(65) Prior Publication Data
US 2022/0355252 A1    Nov. 10, 2022

(30) Foreign Application Priority Data
Dec. 19, 2019 (JP) ................. 2019-229701

(51) Int. Cl.
*B01D 63/02* (2006.01)
*B29C 65/00* (2006.01)
(Continued)

(52) U.S. Cl.
CPC ...... *B01D 63/0221* (2022.08); *B29C 66/1142* (2013.01); *B29K 2101/12* (2013.01); *B29K 2309/08* (2013.01); *B29L 2031/755* (2013.01)

(58) Field of Classification Search
CPC ........... B01D 63/0221; B01D 2313/20; B01D 2313/205; B01D 2313/2061; B01D 35/30;
(Continued)

(56) References Cited

U.S. PATENT DOCUMENTS

| 2007/0039868 A1 | 2/2007 | Ishibashi |
| 2015/0197431 A1* | 7/2015 | Shiki ....................... C02F 1/444 |
|  |  | 210/652 |

(Continued)

FOREIGN PATENT DOCUMENTS

| CN | 1859966 A | 11/2006 |
| CN | 202343103 U | 7/2012 |

(Continued)

OTHER PUBLICATIONS

English language machine translation of JP 2019-195800, 15 pages, No Date.*

(Continued)

*Primary Examiner* — Pranav N Patel
(74) *Attorney, Agent, or Firm* — KENJA IP LAW PC

(57) ABSTRACT

A hollow fiber membrane module 10 has a hollow fiber membrane bundle 11 and a housing case 15. The housing case 15 has first molding members 17 and a second molding member 18. At each first molding member, a tubular portion 19 and a nozzle portion 20 are integrally molded. The second molding member 18 has a tubular shape coaxially continuous from the tubular portion 19. Values obtained by dividing, by the wall thickness of the second molding member, the wall thicknesses of the housing case 15 at positions separated in the axial direction from a connecting position toward the first molding member 17 side by distances of 3 times and 5 times the wall thickness of the second molding member 18 are 1.0 to 1.3 and 1.0 to 1.5, respectively.

9 Claims, 24 Drawing Sheets

(51) Int. Cl.
      *B29K 101/12*     (2006.01)
      *B29K 309/08*     (2006.01)
      *B29L 31/00*      (2006.01)

(58) Field of Classification Search
      CPC .............. B01D 35/301; B01D 2201/30; B01D
                  2113/20; B01D 2113/2011; B29C
                  66/1142; B29C 65/8253; B29C 66/73921;
                  B29C 65/08; B29C 65/4895; B29C 66/71;
                  B29C 66/7212; B29C 65/1432; B29C
                  65/1467; B29C 66/1222; B29C 66/1224;
                  B29C 66/534; B29C 66/543; B29K
                  2101/12; B29K 2309/08; B29L 2031/755;
                  B29L 2031/14; Y02E 60/50
      See application file for complete search history.

(56)             References Cited

U.S. PATENT DOCUMENTS

2016/0144320 A1    5/2016    Nishio et al.
2017/0050148 A1*   2/2017    Taniguchi .............. B01D 63/02
2020/0171438 A1    6/2020    Kasai et al.

FOREIGN PATENT DOCUMENTS

CN         104772041 A      7/2015
EP           1964603 A1     9/2008
JP          S61157308 A     7/1986
JP           H0549874 A     3/1993
JP          H08229359 A     9/1996
JP         2002045656 A     2/2002
JP         2003080037 A     3/2003
JP         2006116134 A     5/2006
JP         2012045453 A     3/2012
JP            3200651 U    10/2015
JP         2017039122 A     2/2017
JP         2017100105 A     6/2017
JP         2019051451 A     4/2019
JP         2019195800 A    11/2019
WO         2014204002 A1   12/2014
WO         2017131126 A1    8/2017
WO         2018235871 A1   12/2018

OTHER PUBLICATIONS

Feb. 16, 2021, International Search Report issued in the International Patent Application No. PCT/JP2020/047160.
May 17, 2022, International Preliminary Report on Patentability issued in the International Patent Application No. PCT/JP2020/047160.

* cited by examiner

First molding member     Second molding member

HOLLOW FIBER MEMBRANE MODULE AND MANUFACTURING METHOD THEREFOR

CROSS-REFERENCE OF RELATED APPLICATION

This application claims priority to Japanese Patent Application No. 2019-229701, filed on Dec. 19, 2019, the entire disclosure of which is incorporated herein by reference.

TECHNICAL FIELD

The present disclosure relates to a hollow fiber membrane module, in particular to a hollow fiber membrane module having improved pressure resistance.

BACKGROUND

Hollow fiber membranes are known as membranes used for membrane filtration methods that utilize microfiltration or ultrafiltration membranes for gas-liquid absorption, degassing, filtration and other applications. Membrane modules using hollow fiber membranes have been widely used for various membrane separation applications for their large membrane area and the capability of reducing the device size. As the membrane modules of this type, such membrane modules are known which have a hollow fiber membrane bundle composed of a plurality of hollow fiber membranes fixed at both ends with a resin portion.

In order to increase the processing amount by a single hollow fiber membrane module, it is considered to increase the size of the hollow fiber membrane module by increasing the size of the housing body for accommodating the hollow fiber membrane bundle. Since the housing body is a molded product made of resin, for example, it is difficult to mold it with a single member as the size increases. Therefore, it is known that the housing body is formed by connecting separate parts (see Patent Literature (PTL) 1).

CITATION LIST

Patent Literature

PTL 1: JP2019051451 (A)

SUMMARY

Technical Problem

During a filtration operation, a positive pressure is applied to the housing body that accommodates a hollow fiber membrane bundle from the inside to the outside of the housing body. Thus, the housing body is required to have pressure resistance according to the operating conditions. In particular, in a housing body formed by connecting a plurality of parts, fracture is likely to occur starting from the connecting portion, and it is necessary to improve the pressure resistance at the connecting portion to improve the overall pressure resistance.

Solution to Problem

We have diligently studied and found that the aforementioned challenge could be solved by reducing stress concentration on connecting portions in the housing case of the hollow fiber membrane module, then completed the present disclosure. Specifically, the present disclosure is as follows:

(1) A hollow fiber membrane module, comprising:
- a hollow fiber membrane bundle configured by bundling a plurality of hollow fiber membranes; and
- a housing case that has first molding members each formed by integrally molding a tubular portion and a nozzle portion with a lumen communicated with the tubular portion and a tubular second molding member coaxially continuous with the tubular portion and accommodates the hollow fiber membrane bundle, wherein
- the total length of the housing case in the axial direction exceeds 1 m; and
- values obtained by dividing, by a wall thickness of the second molding member, a wall thicknesses of the housing case at positions separated from a connecting position between each first molding member and the second molding member toward the first molding member side by distances of 3 times and 5 times the wall thickness of the second molding member in the axial direction are 1.0 to 1.3 and 1.0 to 1.5, respectively.

(2) The hollow fiber membrane module of (1), wherein the second molding member has a cylindrical shape with an inner diameter of 150 mm or more.

(3) The hollow fiber membrane module of (2), wherein the second molding member has a cylindrical shape with an inner diameter of 200 mm or more.

(4) The hollow fiber membrane module of any one of (1) to (3), wherein fracture occurs, due to pressurization inside the housing case, from a part other than the connecting position as a starting point.

(5) The hollow fiber membrane module of any one of (1) to (4), wherein the first molding members and the second molding member are molded by a resin material selected from at least one of ABS resin, polyvinyl chloride, polyphenylene ether, polypropylene, polysulfone, polyethersulfone, and polyphenylene sulfide.

(6) The hollow fiber membrane module of any one of (1) to (5), wherein the first molding members and the second molding member are molded by the same resin material.

(7) The hollow fiber membrane module of any one of (1) to (6), wherein at least one of the first molding member and the second molding member is molded by a resin material mixed with glass fiber.

(8) A manufacturing method of the hollow fiber membrane module of any one of (1) to (7), wherein the method comprising forming the housing case by butt-joining each first molding member and the second molding member.

(9) The manufacturing method of (8), comprising joining each first molding member and the second molding member by any one of heating, contact heating and organic solvent.

Advantageous Effect

According to the present disclosure, a hollow fiber membrane module with an improved overall pressure resistance can be provided.

DETAILED DESCRIPTION

Hereinafter, an embodiment for embodying the present disclosure (hereinafter referred to merely as "this embodiment") will be described in detail. The following embodiment is for illustrative purposes only and shall not be construed restrictive in any manner. The present disclosure can be practiced as appropriate in various modifications without departing from the scope thereof.

Figure 1:
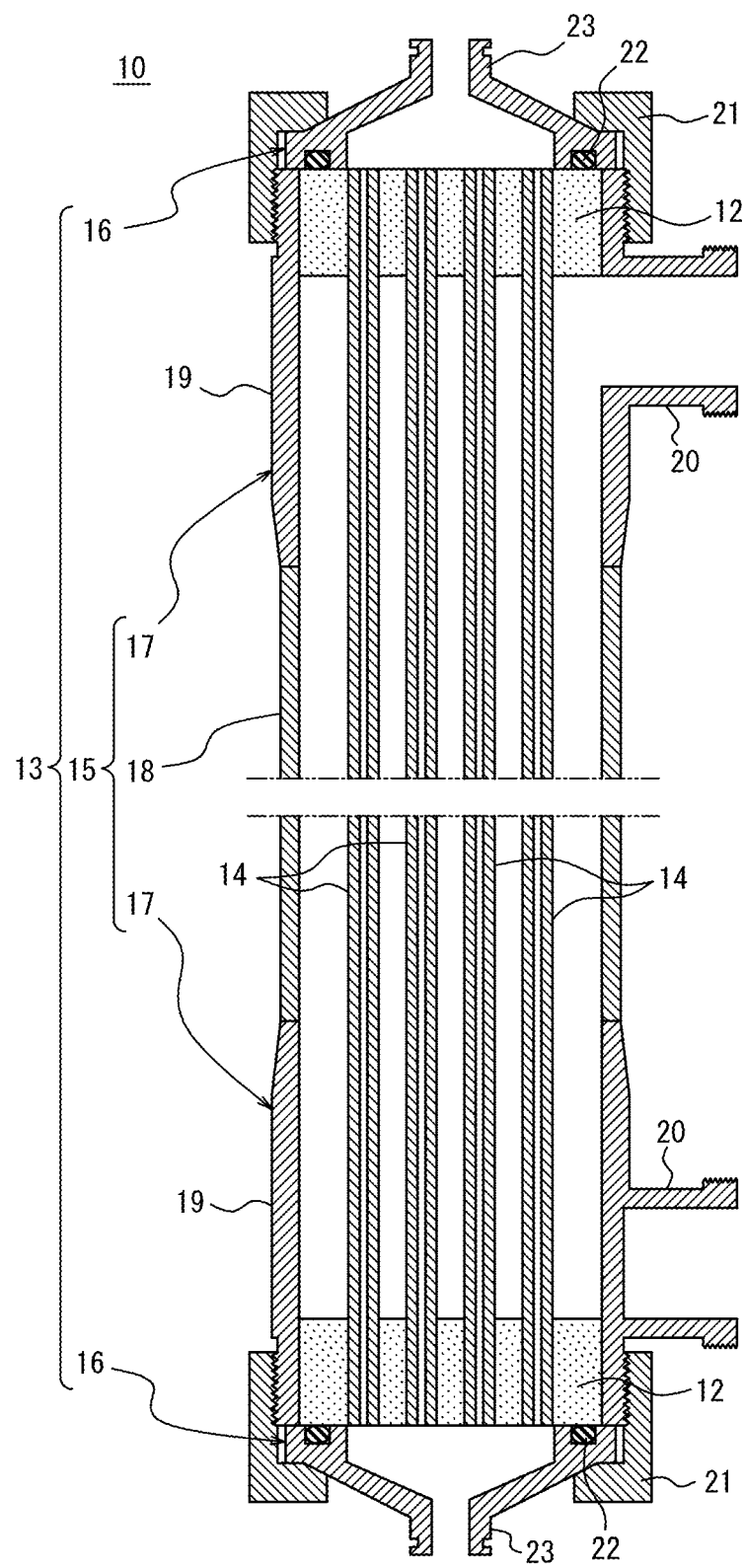
FIG. 1 is a vertical sectional view illustrating a hollow fiber membrane module according to an embodiment of the present disclosure.

As illustrated in FIG. 1, the hollow fiber membrane module 10 according to this embodiment comprises a hollow fiber membrane bundle 11, potting materials 12, and a module case 13.

The hollow fiber membrane bundle 11 is formed by bundling a plurality of hollow fiber membranes 14. Each hollow fiber membrane 14 is porous, and filters fluids passing therethrough.

Examples of the material of the hollow fiber membrane 14 include, but are not particularly limited to, for example, polyvinylidene fluoride, polyolefins such as polyethylene and polypropylene, an ethylene-vinyl alcohol copolymer, polyamide, polyetherimide, polystyrene, polyvinyl alcohol, polyphenylene ether, polyphenylene sulfide, polysulfone, polyethersulfone, acrylonitrile, and cellulose acetate. Of these, from the perspective of imparting a strength, preferred are crystalline thermoplastic resins such as crystalline polyethylene, polypropylene, ethylene-vinyl alcohol copolymer, polyvinyl alcohol, and polyvinylidene fluoride. More preferred are polyolefins, polyvinylidene fluoride, and the like which are hydrophobic and thus have high water resistance and are expected to have durability for filtration of typical aqueous liquids. Most preferable is polyvinylidene fluoride which has excellent chemical durability such as chemical resistance. Examples of polyvinylidene fluoride include vinylidene fluoride homopolymers and vinylidene fluoride copolymers that have a molar ration of vinylidene fluoride of 50% by mol or more. Examples of vinylidene fluoride copolymers include copolymers of vinylidene fluoride and one or more monomers selected from tetrafluoroethylene, hexafluoropropylene, trifluorochloroethylene, and ethylene. Vinylidene fluoride homopolymers are most preferred as polyvinylidene fluoride.

The dimension of the hollow fiber membrane 14 is not particularly limited, but the hollow fiber membrane 14 having an inner diameter of 0.4 to 3 mm, an outer diameter of 0.8 to 6 mm, a thickness of 0.2 to 1.5 mm, a blocking pore size of the hollow fiber membrane 14 of 0.02 to 1 μm, and a pressure resistance in terms of the transmembrane pressure of 0.1 to 1.0 MPa is preferably used.

The potting material 12 secures at least a part of the hollow fiber membrane 14 to the module case 13. In this embodiment, the potting material 12 is integrated with each end of the hollow fiber membrane 14, and is secured to a housing case 15 (described below) of the module case 13. In this embodiment, the potting material 12 is formed by filling the potting material 12 between the outer circumferential surface of the hollow fiber membrane 11 and the inner circumferential surface of the housing case 15, and curing the filled potting material 12.

The raw material of the potting material 12 is not particularly limited, but dual-liquid mixed curable resins may be used, for example, and a urethane resin, an epoxy resin, and a silicone resin are preferably used. The potting material 12 is desirably selected appropriately, considering the viscosity, the work life, the hardness and mechanical strength of a cured product, and physical and chemical stabilities when being exposed to a raw liquid, adhesion with the hollow fiber membrane 14, and adhesion with the module case 13. For example, from the viewpoints of reducing manufacturing time and increasing the productivity, a urethane resin with a shorter work life is preferably used. In applications where a higher mechanical strength is required, an epoxy resin having a high mechanical durability is preferably used. Two or more such resins may be used as the potting material 12.

The module case 13 accommodates the hollow fiber membrane bundle 11. The module case 13 comprises the housing case 15 and two cap members 16.

In this embodiment, the housing case 15 has entirely a tubular shape, and accommodates the hollow fiber membranes 14 inside the tubular body. The axial total length of the housing case 15 exceeds 1 m. The housing case 15 has two first molding members 17 and a second molding members 18, which are separate members.

Each first molding member 17 has a tubular portion 19 and a nozzle portion 20, which are integrally molded. The nozzle portion 20 is provided on the side of the tubular portion 19 so as to protrude perpendicularly with respect to the axial direction of the tubular portion 19. The nozzle portion 20 is provided on the second molding member 18 side of the potting material 12 in the axial direction of the tubular portion 19. The lumens of the tubular portion 19 and the nozzle portion 20 communicate with each other.

The nozzle portion 20 functions as a port to permit passage of a fluid between inside and outside of the first molding member 17. Therefore, the nozzle portion 20 may permit inflows of a fluid into the internal spaces defined by the inner circumferential surface of the housing case 15, the outer circumferential surface of each hollow fiber membrane 14, and the exposed surface of the potting material 12 from outside, and as well as permitting outflows of the fluid from the internal spaces.

The material of the first molding member 17 is not particularly limited, but resin material selected from at least one of, for example, ABS resin, polyvinyl chloride (PVC), polyphenylene ether (PPE), polypropylene (PP), polysulfone (PSF), polyethersulfone (PES) and polyphenylene sulfide (PPS) may be used. These resin materials may be mixed with glass fiber. The first molding member 17 can be produced by injection molding, extrusion molding, or the like.

The second molding member 18 is tubular, for example. The second molding member 18 may be cylindrical. Both ends of the second molding member 18 in the axial direction are connected to respective first molding members 17.

The wall thickness of the second molding member 18 is substantially constant. The wall thickness of the second molding member 18 may change depending on the position in the axial direction. The second molding member 18 may be cylindrical with an inner diameter of 150 mm or more, and preferably be cylindrical with an inner diameter of 200 mm or more.

The material of the second molding member 18 is not particularly limited, but resin material selected from at least one of, for example, ABS resin, polyvinyl chloride (PVC), polyphenylene ether (PPE), polypropylene (PP), polysulfone (PSF), polyether sulfone (PES) and polyphenylene sulfide (PPS) may be used. The second molding member 18 may be molded by the same as or different from the resin material of the first molding member 17. These resin materials may be mixed with glass fiber. The second molding member 18 can be manufactured by injection molding, extrusion molding, or the like.

The housing case 15 is formed by coaxially and continuously connecting the tubular portion 19 of the first molding member 17 to both ends of the second molding member 18 in the axial direction. The connection is preferably a joint in which an end face of the tubular portion 19 of the first molding member 17 is butted against an end face of the second molding member 18 in the axial direction. The joining is preferably either heating, contact heating, or adhesion using an organic solvent. Alternatively, the joining may be insertion of one of the tubular portion 19 of the first molding member 17 and the second molding member 18 into another.

The connecting positions of the first molding member 17 and the second molding member 18 in the axial direction are the positions of end faces of the first molding member 17 and the second molding member 18 butted against each other in a configuration in which end faces are butted against each other to join. In this embodiment, in a configuration in which one of the tubular portion 19 of the first molding member 17 and the second molding member 18 is inserted into another, the connecting position should be a position closest to the second molding member 18 side in the range where the tubular portion 19 and the second molding member 18 overlap each other when viewed from the direction perpendicular to the axial direction.

When a boundary between the first molding member 17 and the second molding member 18 is visually confirmed in the cross section passing through the axis of the housing case 15, the connecting position between the first molding member 17 and the second molding member 18 is a position of the boundary in the axial direction. When the boundary between the first molding member 17 and the second molding member 18 is not visually confirmed, the connecting position is determined by the method described below.

A peripheral portion that seems to be a connecting position is cut off on the central side of the nozzle portion 20 of the housing case 15 in the longitudinal direction. The boundary is confirmed by cutting or slicing the cut off part along the axial direction and observing the cross section in a magnified view. If it is difficult to confirm the boundary by mere magnified observation, the boundary is confirmed by at least one of the magnified observation of the cross section after coloring with ink and the magnified observation with polarized light transmitted through a sample collected in the form of a thin film in the vicinity of the surface of the cross section. Further, when one of the first molding member 17 and the second molding member 18 is formed of a resin to which a filler such as glass fiber is added, the boundary can be easily and clearly confirmed by transmission analysis using X-rays such as an X-ray microscope. When the boundary between the first molding member 17 and the second molding member 18 is confirmed with these methods, the position of the boundary in the axial direction is determined as a connecting position.

The wall thickness of the housing case 15 at the position separated from the connecting position by three times the wall thickness of the second molding member 18 in the axial direction, which is the wall thickness of the tubular portion 19 in FIG. 1, is 1.0 to 1.3 times the wall thickness of the second molding member 18 at the connecting position. In other words, a value obtained by dividing the wall thickness of the housing case 15 at the position by the wall thickness of the second molding member 18 is 1.0 to 1.3.

The wall thickness of the housing case 15 at the position separated from the connecting position described later by a distance of five times the wall thickness of the second molding member 18 in the axial direction, in other words, the wall thickness of the tubular portion 19, is 1.0 to 1.5 times the wall thickness of the second molding member 18 at the connecting position. In other words, a value obtained by dividing the wall thickness of the housing case 15 at the position by the wall thickness of the second molding member 18 is 1.0 to 1.5.

In this embodiment, each cap member 16 has a tubular or tapered shape with one end open. The open end of the cap member 16 engages with the housing case 15 at each of both ends of the housing case 15 in the axial direction. In this embodiment, each cap member 16 is secured to the housing case 15 by the nut 21. An O-ring 22 is provided between each cap member 16 and at least one of the potting member 12 and the housing case 15, such that the internal space defined by the cap member 16 and the housing case 15 is sealed fluid-tightly.

At the closed end or the smaller-diameter side of the taper of each cap member 16, a conduit 23 is provided. Each conduit 23 protrudes in parallel to the axial direction of the housing case 15. Each conduit 23 functions as a port to allow passage of a fluid entering to and exiting from the cap member 16. Thus, the conduit 23 may allow inflows of a fluid into the internal space defined by the cap member 16 and the potting member 12 from outside, and as well as allow outflows of the fluid from the internal space.

In addition, in an example of this embodiment, both ends of each hollow fiber membrane 14 in the longitudinal direction has an opening exposed to the space defined by the potting material 12 and the cap member 16.

In the hollow fiber membrane module 10 configured in the above described manner, for example, a part of raw liquid introduced from one conduit 23 into the hollow fiber membrane module 10 is filtered by the hollow fiber membrane 14 while passing through the hollow portion of the hollow fiber membrane 14 toward the other conduit 23. The filtered liquid (i.e., filtrate) enters an internal space defined by the inner circumferential surface of the housing case 15, the outer circumferential surface of the hollow fiber membrane 14 and the exposed surface of both potting materials 12. The filtrate entering the internal space is discharged from the nozzle portion 20. Further, the raw liquid passing through the hollow portion of the hollow fiber membrane 14 to the other conduit 23 is discharged, as a concentrated liquid, from the other conduit 23. Alternatively, when the raw liquid is entered to one nozzle portion 20 of the hollow fiber membrane module 10, the filtrate is discharged from the conduit 23, and the concentrated liquid may be discharged from the other nozzle portion 20.

Figure 2:
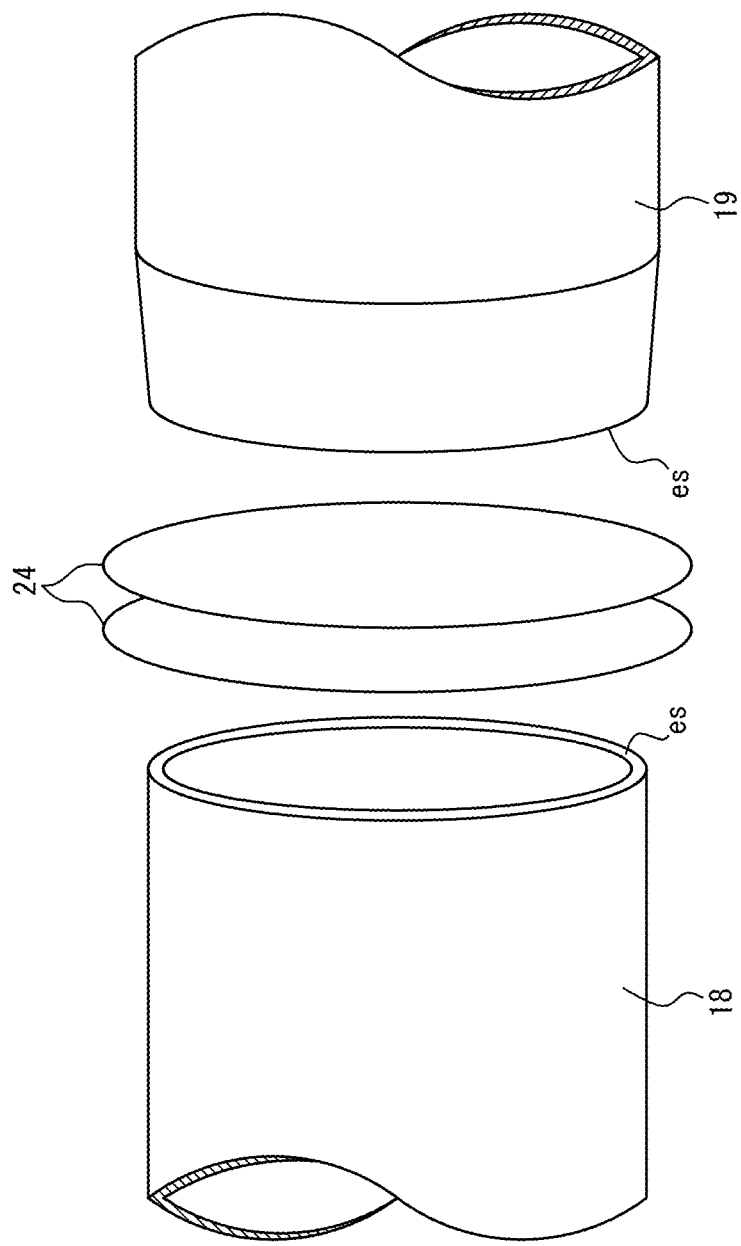
FIG. 2 is a diagram for explaining a manufacturing method of the hollow fiber membrane module illustrated in FIG. 1, and illustrates a disposition of a first molding member and a second molding member in a joining process of the first molding member and the second molding member.

Next, a manufacturing method of the above described hollow fiber membrane module 10 will be described. The first molding member 17 and the second molding member 18 are molded by a molding method such as an injection molding or an extrusion molding. One end face of the tubular portion 19 of the molded first molding member 17 in the axial direction and the end face of the second molding member 18 in the axial direction are faced to each other in a separate state. As illustrated in FIG. 2, heaters 24 are interposed between opposing end faces es to heat the end faces.

After both end faces es are molten, the heaters 24 are pulled out and both end faces es are butted against each other to join the first molding member 17 and the second molding member 18. When the first molding member 17 and the second molding member 18 are joined, they may be pressed such that the vicinity of the molten end faces bulges from the outer circumferential surface. The housing case 15 is formed by joining each first molding member 17 to both ends of the second molding member 18.

The both end faces es of the tubular portion 19 of the first molding member 17 and the second molding member 18 may be heated, instead of using the heaters 24, by applying ultrasonic waves to the vicinity of the end faces es with the both end faces es butted against each other. Further, both end faces es may be joined by melting with an organic solvent, instead of by heating to join them.

The hollow fiber membranes 14 are bundled cylindrically into a hollow fiber membrane bundle 11 so as to be inserted into the housing case 15 to thereby maximize a membrane area, that is, a filtration area, per membrane module. The outer circumference of the hollow fiber membrane bundle 11 may further be covered with a protective net. The material of the net is not particularly limited, but preferred are polyethylene, polypropylene, polyvinyl alcohol, and an ethylene-vinyl acetate copolymer, or the like.

The ends of the hollow fiber membrane bundle 11 are desirably sealed for preventing occlusion with a potting agent in the following potting step. As a material used for the sealing, an epoxy resin, a urethane resin, a silicone resin, or the like, is used.

After inserting the sealed hollow fiber membrane bundle 11 into the housing case 15, a potting step is carried out in which a potting agent is used to adhere the fiber membrane bundle to the ends of the housing case 15. The adhesion may be achieved by a centrifugal adhesion in which the center of the housing case 15 is rotated to thereby introduce the potting material 12 by means of the centrifugal force generated by the rotation, or a static adhesion in which the housing case 15 is placed so as to stand vertically to thereby introduce the potting material 12 by means of the difference of the head. An appropriate adhesion method may be selected, depending on the total length of the hollow fiber membrane module 10, the diameter of the housing case 15, and the initial viscosity and the pot life of the potting agent used. After the potting material 12 cures, the time for curing at a higher temperature may be provided. After the potting material 12 completely cures, the sealed parts are removed to open the ends of the hollow fiber membrane 14.

The housing case 15 with the hollow fiber membrane bundle 11 secured inside by the potting material 12 is covered with cap members 16 at both ends in the axial direction. The cap members 16 are secured to the housing case 15 with nuts 21.

According to the hollow fiber membrane module 10 configured as described above, for example, by introducing raw water into the hollow fiber membrane module 10 through the nozzle portion 20, the raw water filtered by the hollow fiber membrane 14 is discharged from the hollow fiber membrane module 10 through at least one of the conduits 23, and the concentrated water is discharged from the hollow fiber membrane module 10 through the other one of the nozzle portions 18. (external pressure type filtration).

Further, by introducing raw water into the hollow fiber membrane module 10 through one of the conduits 23, concentrated water is discharged from the hollow fiber membrane module 10 through the other one of the conduits 23, and the filtered water filtered by the hollow fiber membrane 14 is discharged from the hollow fiber membrane module 10 through the two nozzle portions 20 (internal pressure type filtration).

In the hollow fiber membrane module 10 of the present disclosure, values obtained by dividing, by the wall thickness of the second molding member 18, the wall thickness of the housing case 15 separated from the connecting position by distances of three times and five times the wall thickness of the second molding member 18 toward the first molding member 17 side are 1.0 to 1.3 and 1.0 to 1.5, respectively. With such a configuration, the hollow fiber membrane module 10 has a small change in the wall thickness with respect to the axial displacement of the housing case 15 around the connecting position, thus a rapid change of stress of the housing case 15 at the connecting position can be mitigated when an internal pressure is applied. Therefore, the hollow fiber membrane module 10 suppresses occurrence of fracture of the housing case 15 starting from the connecting position, and generates, with higher pressures, fracture starting from the portions other than the connecting position caused by the pressure inside the housing case 15. In other words, the hollow fiber membrane module 10 has a suitable pressure resistance. For example, in the hollow fiber membrane module 10, a pressure to inside causing fractures of the housing case 15 is 2 MPa or more. More preferably, in the hollow fiber membrane module 10, a pressure to inside causing fractures of the housing case 15 is 3 MPa or more.

EXAMPLES

Although the present disclosure will be described in more detail below by using Examples, the present disclosure is not limited to these Examples.

The measurement method and the test method employed in the Examples will be described below.

(Measurement Method)

To measure the dimensions of the molding members, a digital display caliper conforming to JIS B7507 was used to measure the diameter and wall thickness. For the total length, a caliper conforming to JIS of the same specifications and a dedicated caliper produced from stainless equal-leg angle precisely cut into a predetermined length were used. All measurement values were measured after storing in a test room air-conditioned at 23 to 27° C. for 48 hours or more. In the measurement points, for the diameter and the length, four points were measured in a cross shape, and for the wall thickness, it was measured in four more directions, that is, in eight directions, and the simple averaged numbers up to the first decimal place were regarded as significant figures.

(Test Method)

After preparing a housing case with desired specifications both for Examples and Comparative Examples, stainless steel nuts, stainless steel flanges in place of caps, and O-rings were used as sub-materials and water is sealed inside the housing case, then pressure was applied from one of nozzles, and the water pressure value leading to fracture and the fractured portion were confirmed. The rate of pressure increase for hydraulic pressurization was 0.2 [MPa/sec.], and the pressurized water and ambient water temperature (pressurized in a water tank) were adjusted to room temperatures (23 to 27° C.). A hydraulic pressure test machine from YAMAMOTO SUIATU KOGYOSHO Co., Ltd. was used for fracture tests and a stainless tank (exclusive product) with a top cover (perforated metal) was used as a storage tank.

(Resin Used)

In Example 1 and Comparative Example 1, an ABS resin (Stylac™, AE151 from Asahi Kasei Co.) was used as a material for the second molding member, and an ABS resin (Stylac™, IM-10 from Asahi Kasei Co.) was used as a material for the first molding member.

In Examples 2 and 3 and Comparative Example 2, an ABS resin (Stylac™, AE15P from Asahi Kasei Co.) was used as a material for the second molding member, and an ABS resin (Stylac™, IM15P from Asahi Kasei Co.) was used as a material for the first molding member.

In Reference Examples 1 and 2, polysulfone (UDEL P1700 from Solvay) was used for both of the first molding member and the second molding member.

Example 1

Figure 3:
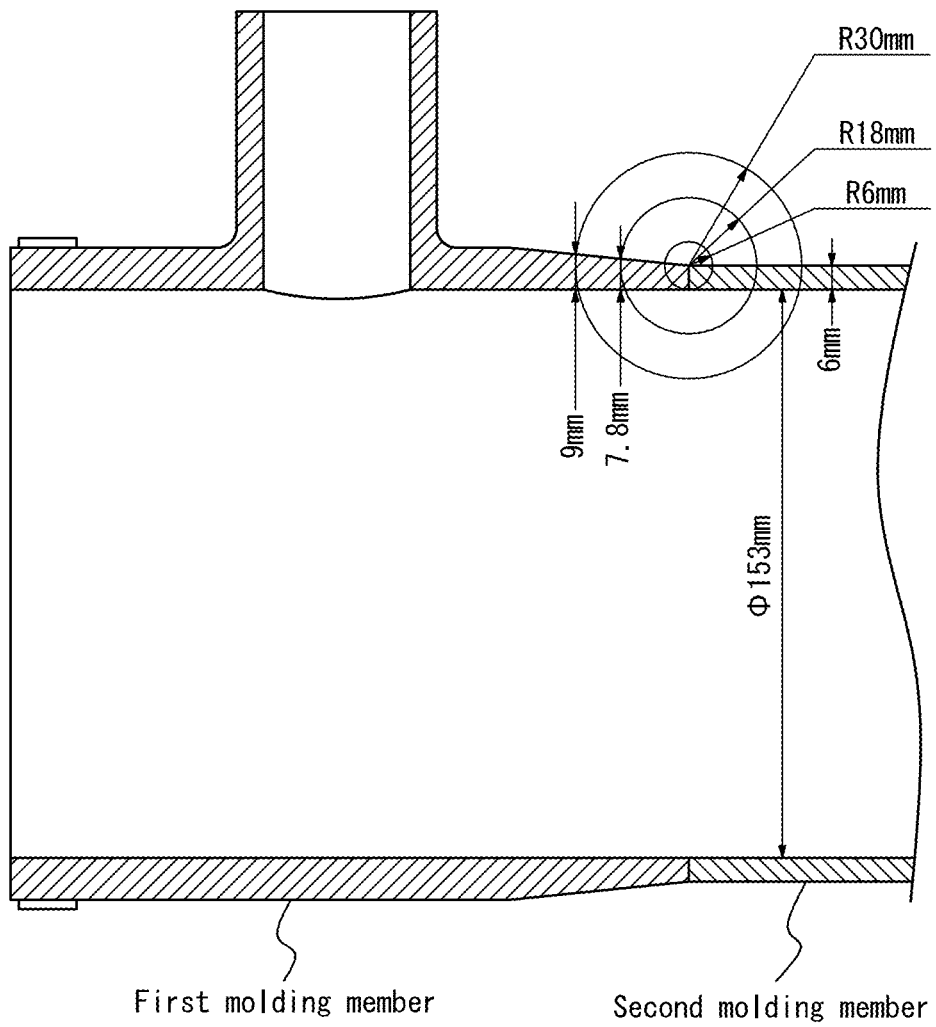
FIG. 3 is a partial half transverse sectional view illustrating dimension of the housing case of Example 1.

As the second molding member, a pipe (inner diameter: 153 mm, wall thickness: 6 mm, length: 1800 mm) made from ABS resin was prepared. The relationship between the inner diameter and the wall thickness of the second molding member was the dimension conforming to the VU pipe of JIS K6741. Further, two pieces of members having a cross section illustrated in FIG. 3 (including the second molding member) were prepared as the first molding members. In FIG. 3, the circle indicated by "R6 mm" is a circle having a radius of 6 mm, which is a distance of the wall thickness of the second molding member from the connecting position between the first molding member and the second molding member. In FIG. 3, the circle indicated by "R18 mm" is a circle having a radius of 18 mm, which is a distance of three times the wall thickness of the second molding member from the connecting position between the first molding member and the second molding member. In FIG. 3, the circle indicated by "R30 mm" is a circle having a radius of 30 mm, which is a distance of five times the wall thickness of the second molding member from the connecting position between the first molding member and the second molding member.

Figure 4:
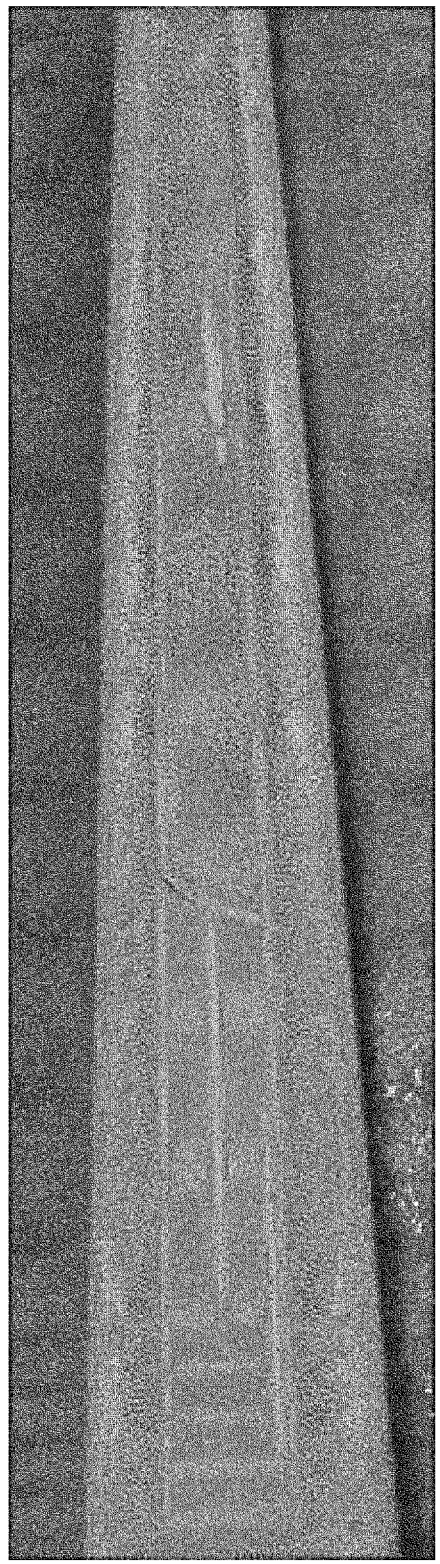
FIG. 4 is an external view of the housing of Example 1 fractured by a pressure test.
Figure 5:
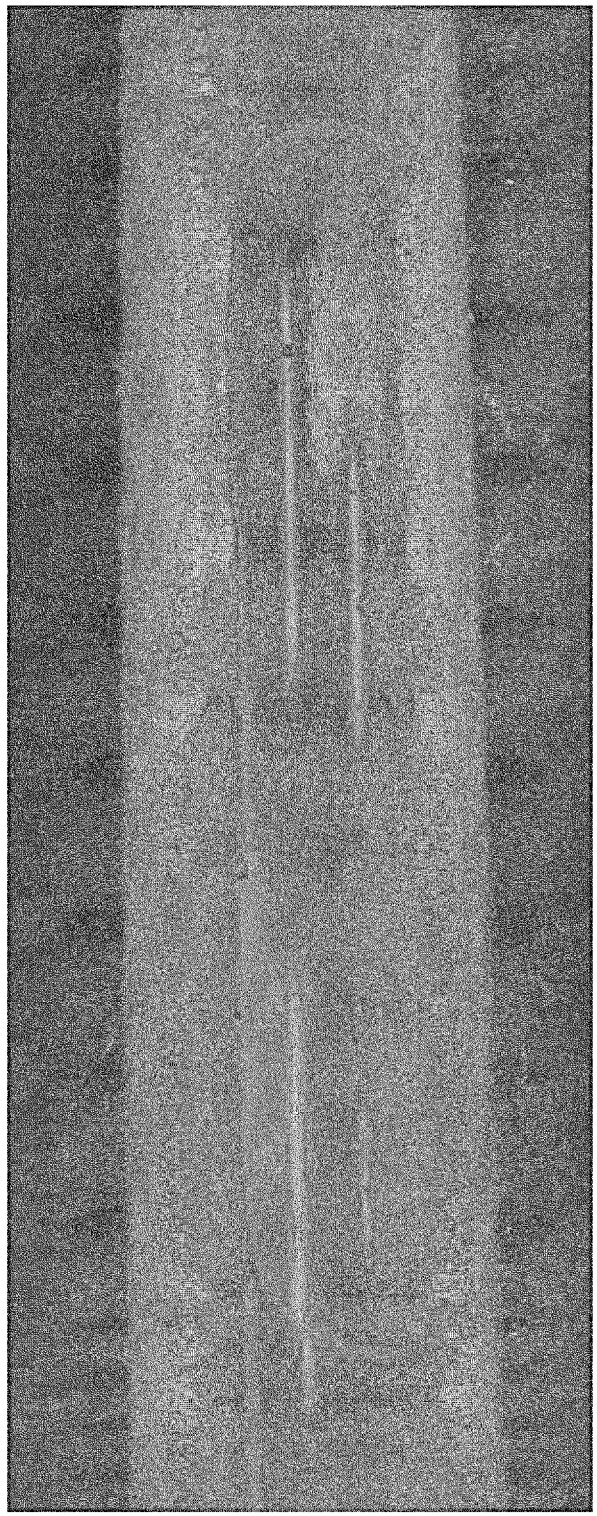
FIG. 5 is an enlarged external view of the housing of Example 1 fractured by the pressure test.

The housing case (total length 2160 mm) of the present disclosure was produced by heating the first molding member and the second molding member by the end face heating apparatus illustrated in FIG. 2 to join them. When pressure was continuously applied, fracture occurred at 3.4 [MPa], and the starting point of the fracture had a shape indicating a linear fracture surface in the longitudinal direction at the almost central portion of the pipe (see FIGS. 4 and 5).

Example 2

Figure 6:
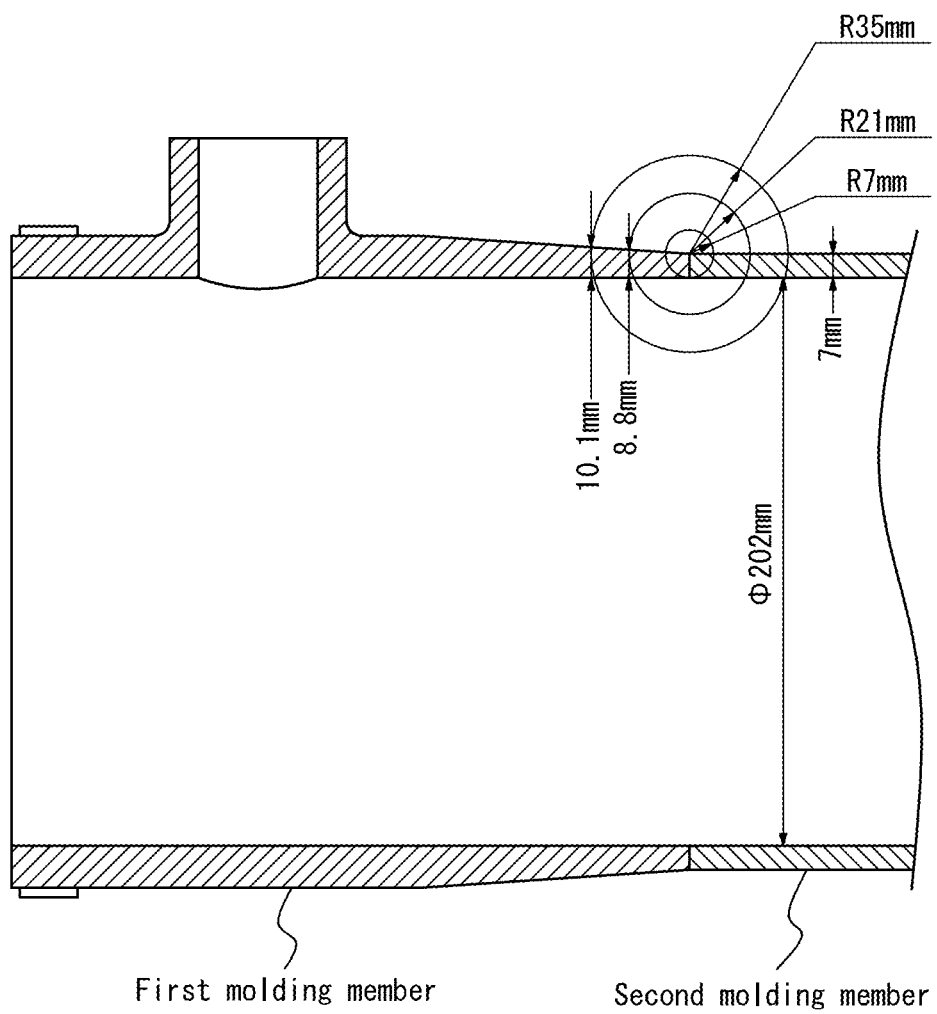
FIG. 6 is a partial half transverse sectional view illustrating dimension of a housing case of Example 2.

As the second molding member, a pipe (inner diameter: 202 mm, wall thickness: 7 mm, length: 1640 mm) made from ABS resin was prepared. The relationship between the inner diameter and the wall thickness of the second molding member was the dimension conforming to the VU pipe of JIS K6741. Further, two pieces of members having a cross section illustrated in FIG. 6 (including the second molding member) were prepared as the first molding member. In FIG. 6, the circle indicated by "R7 mm" is a circle having a radius of 7 mm, which is a distance of the wall thickness of the second molding member from the connecting position between the first molding member and the second molding member. In FIG. 6, the circle indicated by "R21 mm" is a circle having a radius of 21 mm, which is a distance of three times the wall thickness of the second molding member from the connecting position between the first molding member and the second molding member. In FIG. 6, the circle indicated by "R35 mm" is a circle having a radius of 35 mm, which is a distance of five times the wall thickness of the second molding member from the connecting position between the first molding member and the second molding member.

Figure 7:
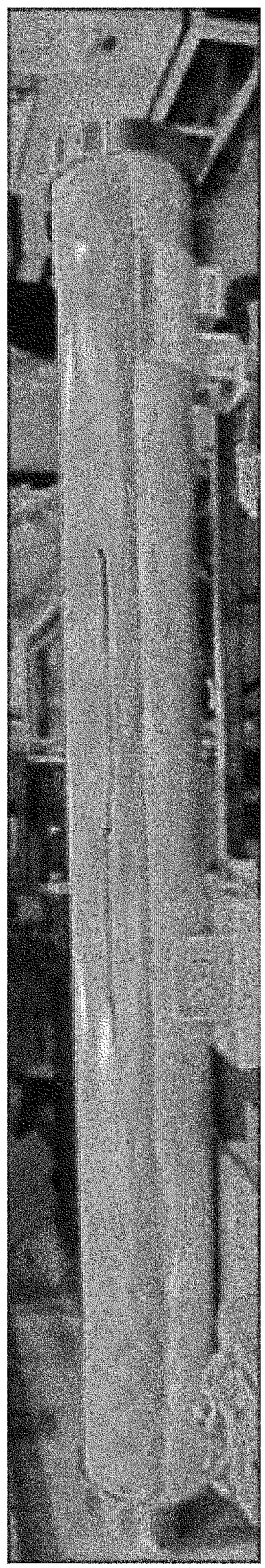
FIG. 7 is an external view of the housing of Example 2 fractured by the pressure test.
Figure 8:
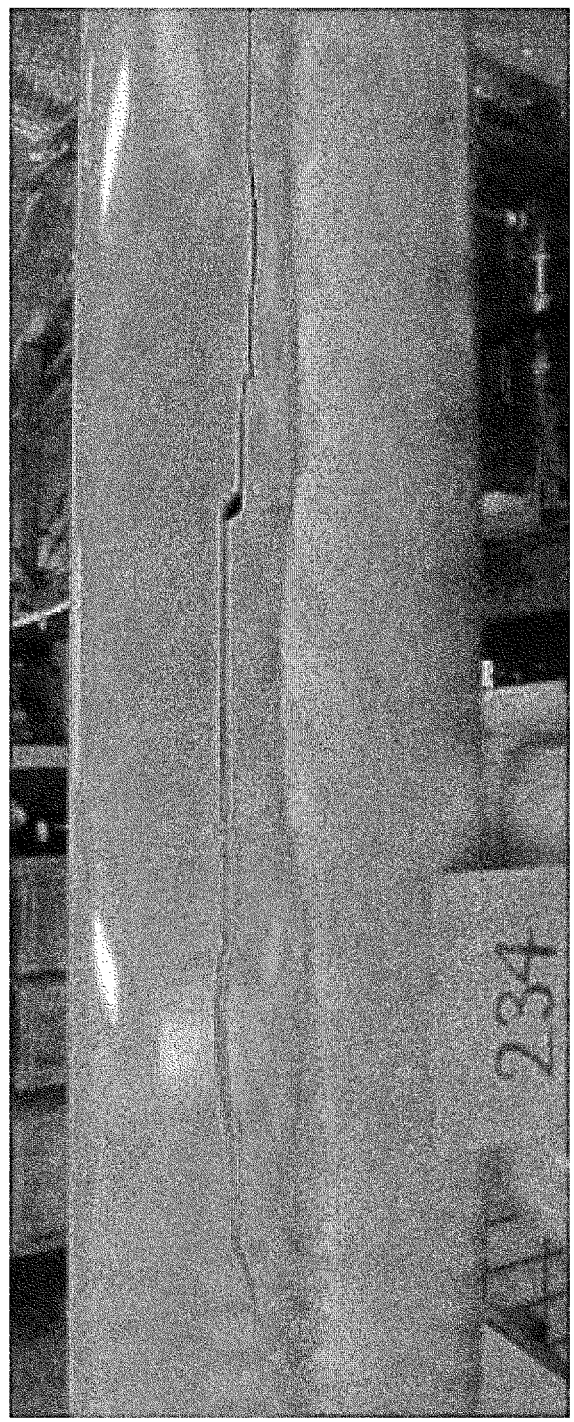
FIG. 8 is an enlarged external view of the housing of Example 2 fractured by the pressure test.

The housing case (total length 2120 mm) of the present disclosure was produced by heating the first molding member and the second molding member by the end face heating apparatus illustrated in FIG. 2 to join them. When pressure was continuously applied, fracture occurred at 3.1 [MPa], and the starting point of the fracture had a shape indicating a jagged fracture surface in the longitudinal direction at the almost central portion of the pipe (see FIGS. 7 and 8).

Example 3

Figure 9:
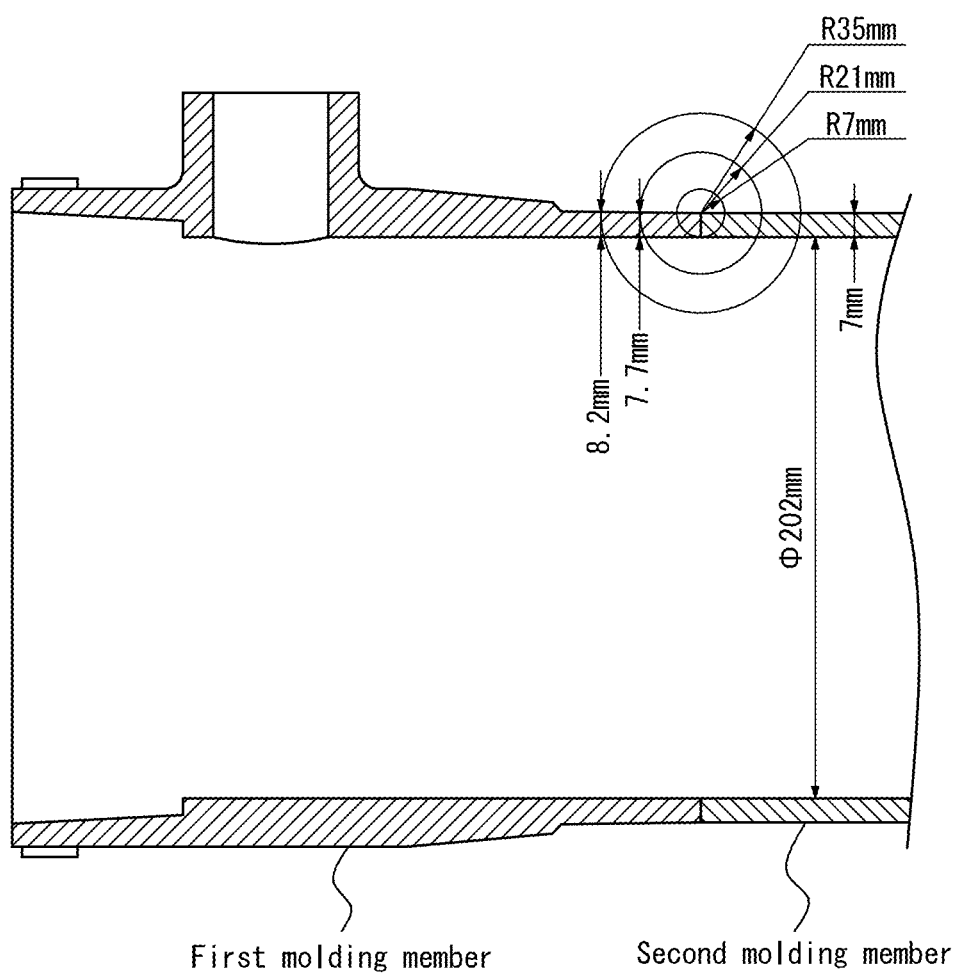
FIG. 9 is a partial half transverse sectional view illustrating dimension of a housing case of Example 3.

As the second molding member, a pipe (inner diameter: 202 mm, wall thickness: 7 mm, length: 680 mm) made from ABS resin was prepared. The relationship between the inner diameter and the wall thickness of the second molding member was the dimension conforming to the VU pipe of JIS K6741. Further, two pieces of members having a cross section illustrated in FIG. 9 (including the second molding member) were prepared as the first molding member. In FIG. 9, the circle indicated by "R7 mm" is a circle having a radius of 7 mm, which is a distance of the wall thickness of the second molding member from the connecting position between the first molding member and the second molding member. In FIG. 9, the circle indicated by "R21 mm" is a circle having a radius of 21 mm, which is a distance of three times the wall thickness of the second molding member from the connecting position between the first molding member and the second molding member. In FIG. 9, the circle indicated by "R35 mm" is a circle having a radius of 35 mm, which is a distance of five times the wall thickness of the second molding member from the connecting position between the first molding member and the second molding member.

Figure 10:
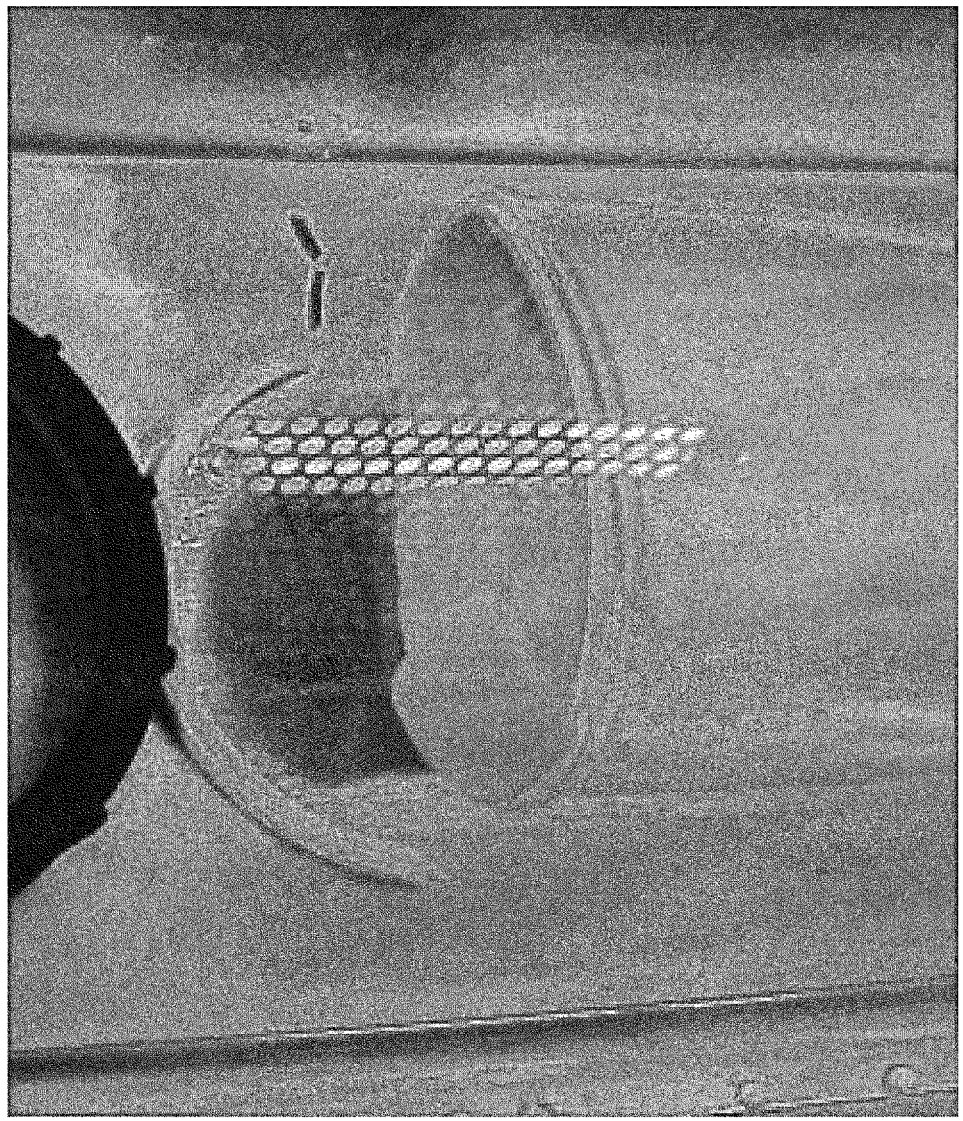
FIG. 10 is a first external view of the housing of Example 3 fractured by the pressure test.
Figure 11:
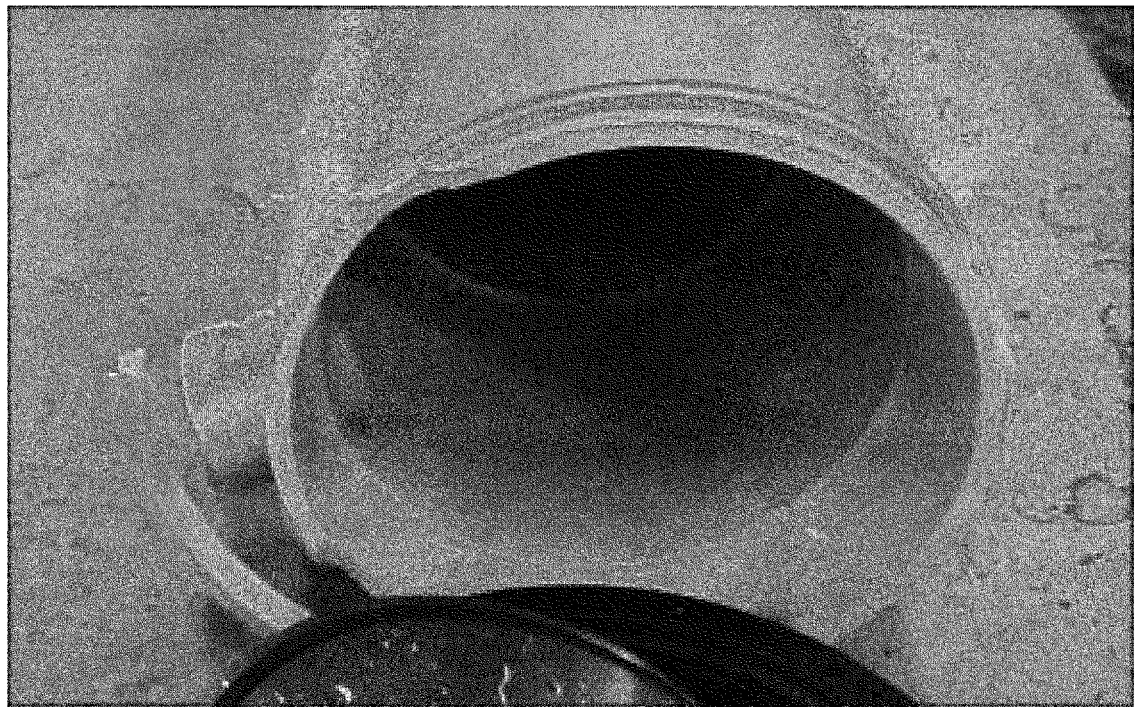
FIG. 11 is a second external view of the housing of Example 3 fractured by the pressure test.

The housing case (total length 1160 mm) of the present disclosure was produced by heating the first molding member and the second molding member by the end face heating apparatus illustrated in FIG. 2 to join them. When pressure was continuously applied, fracture occurred at 2.6 [MPa], and the starting point of the fracture was the thread portion provided on the outer periphery of the first molding member (see FIGS. 10 and 11).

Comparative Example 1

Figure 12:
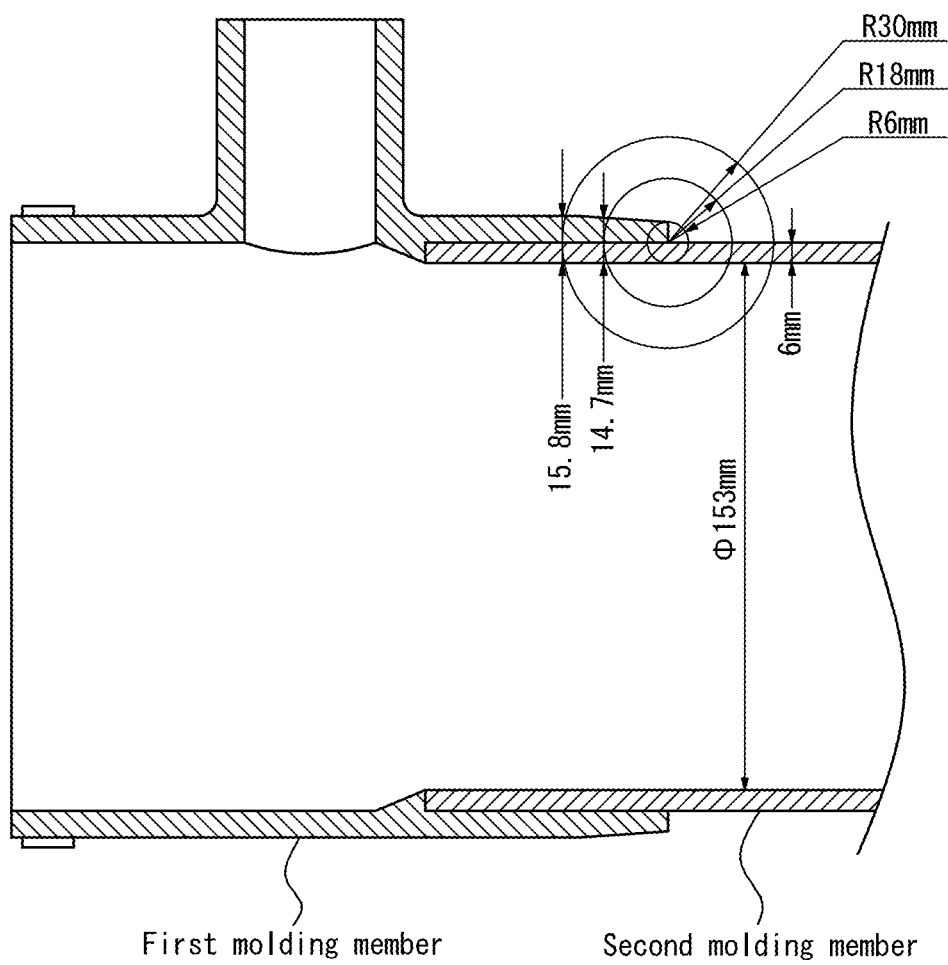
FIG. 12 is a partial half transverse sectional view illustrating dimension of a housing case of Comparative Example 1.
Figure 13:
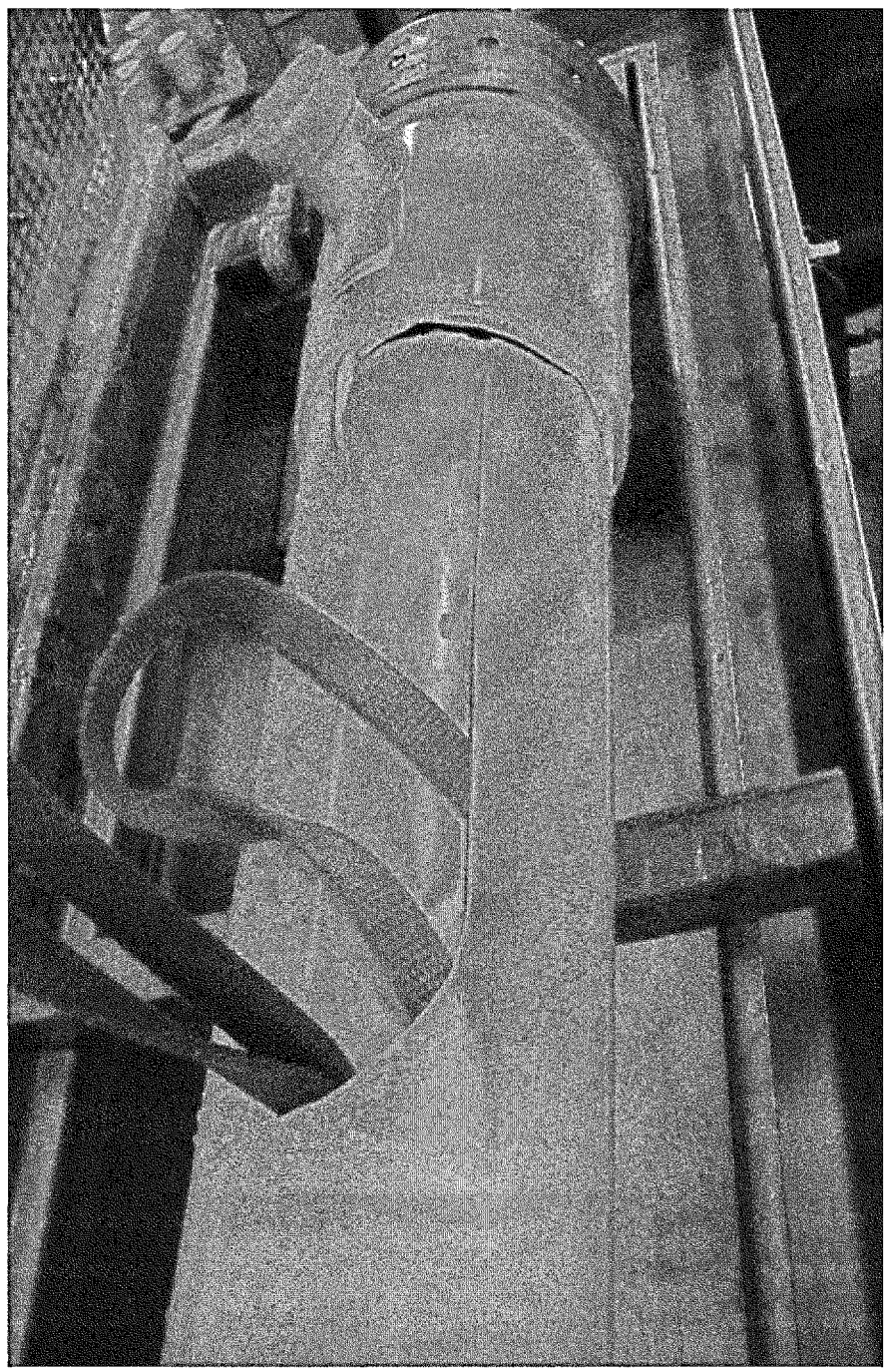
FIG. 13 is an external view of the housing of Comparative Example 1 fractured by the pressure test.
Figure 14:
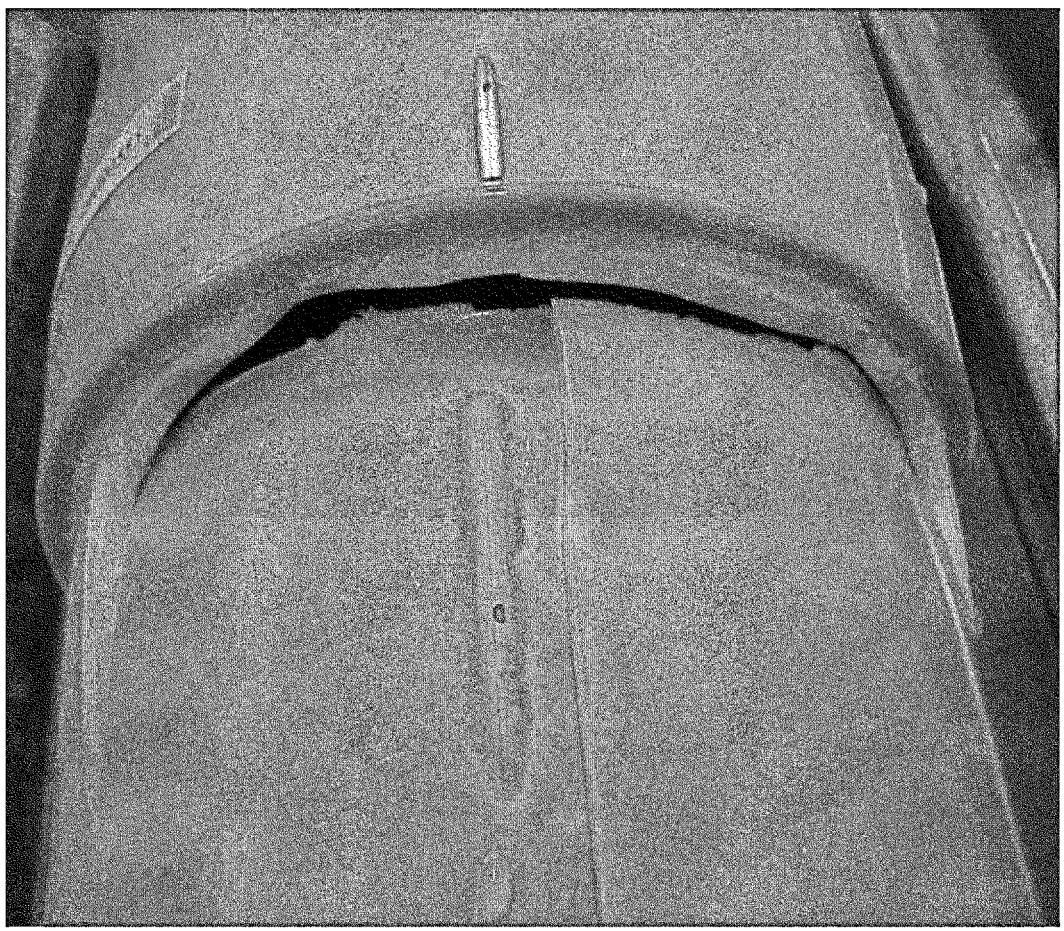
FIG. 14 is an enlarged external view of the housing of Comparative Example 1 fractured by the pressure test.

The same ABS resin pipe except that the length was different (1920 mm) from that of Example 1 was prepared. Further, the first molding member illustrated in FIG. 12 was prepared. In FIG. 12, the circle indicated by "R6 mm" is a circle having a radius of 6 mm, which is a distance of the wall thickness of the second molding member from the connecting position between the first molding member and the second molding member. In FIG. 12, the circle indicated by "R18 mm" is a circle having a radius of 18 mm, which is a distance of three times the wall thickness of the second molding member from the connecting position between the first molding member and the second molding member. In FIG. 12, the circle indicated by "R30 mm" is a circle having a radius of 30 mm, which is a distance of five times the wall thickness of the second molding member from the connecting position between the first molding member and the second molding member. Unlike the housing case of Example 1 illustrated in FIG. 3, the housing case of Comparative Example 1 was produced by joining the second molding member and the first molding member in a state in which the second molding member is inserted into the lumen of the first molded member. The first molding member and the second molding member were solvent-joined by using a MEK (methyl ethyl ketone) dope adhesive known as a solvent for ABS resin. This dope adhesive was obtained by dissolving and mixing 30 parts by weight of the resin pellets used for the ABS resin (this time, the first molding member) in MEK. The first molding member and the second molding member were stored in a room air-conditioned to 35° C. and equipped with a ventilation system for 7 days, waited for the solvent to volatilize, heated at 50° C. for 48 hours, and then cooled to room temperature to obtain a housing case having a total length of 2160 mm. When pressure was applied in the same manner as Example 1, fracture occurred at 3.0 [MPa], and the starting point of the fracture was the boundary between the first molding member and the second molding member (see FIGS. 13 and 14).

Comparative Example 2

Figure 15:
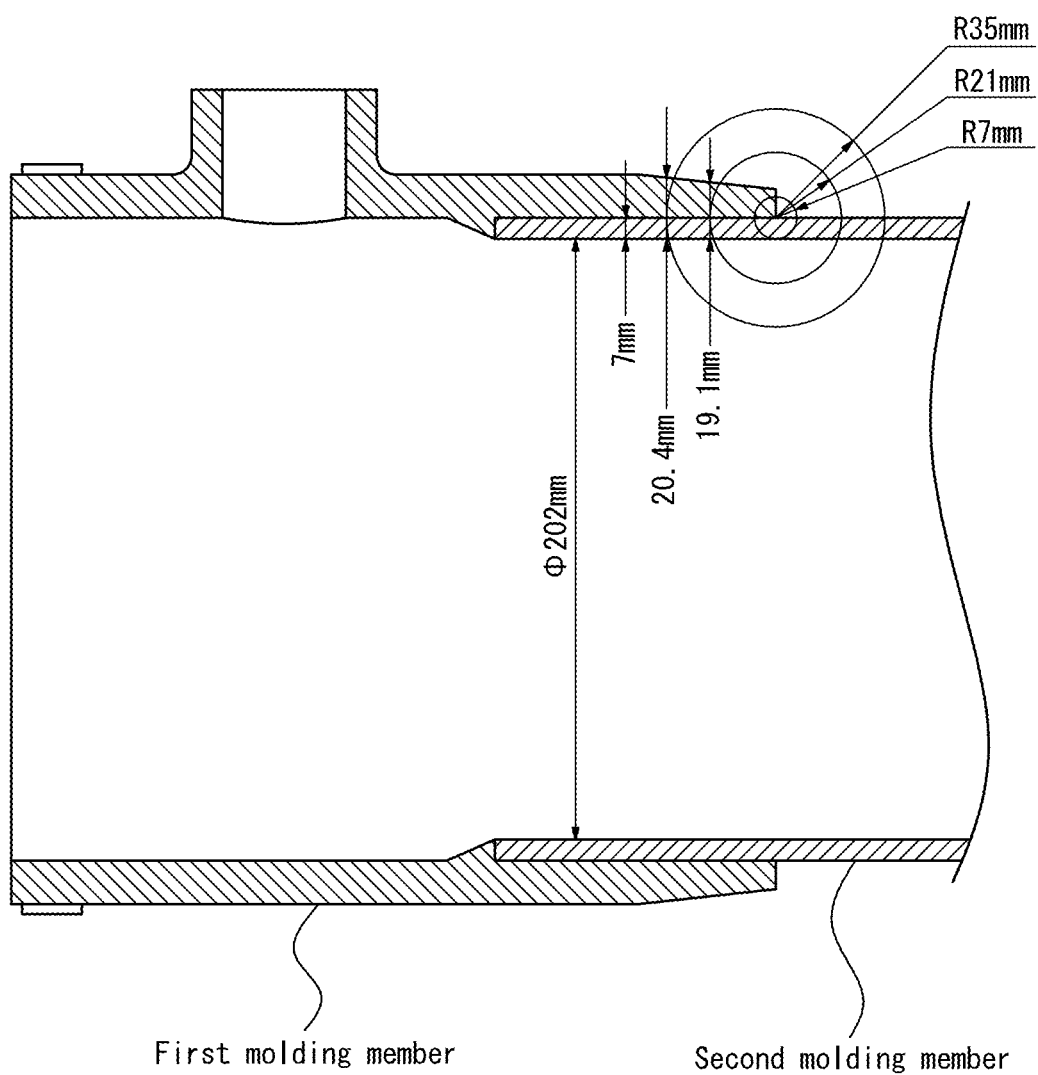
FIG. 15 is a partial half transverse sectional view illustrating dimension of a housing case of Comparative Example 2.
Figure 16:
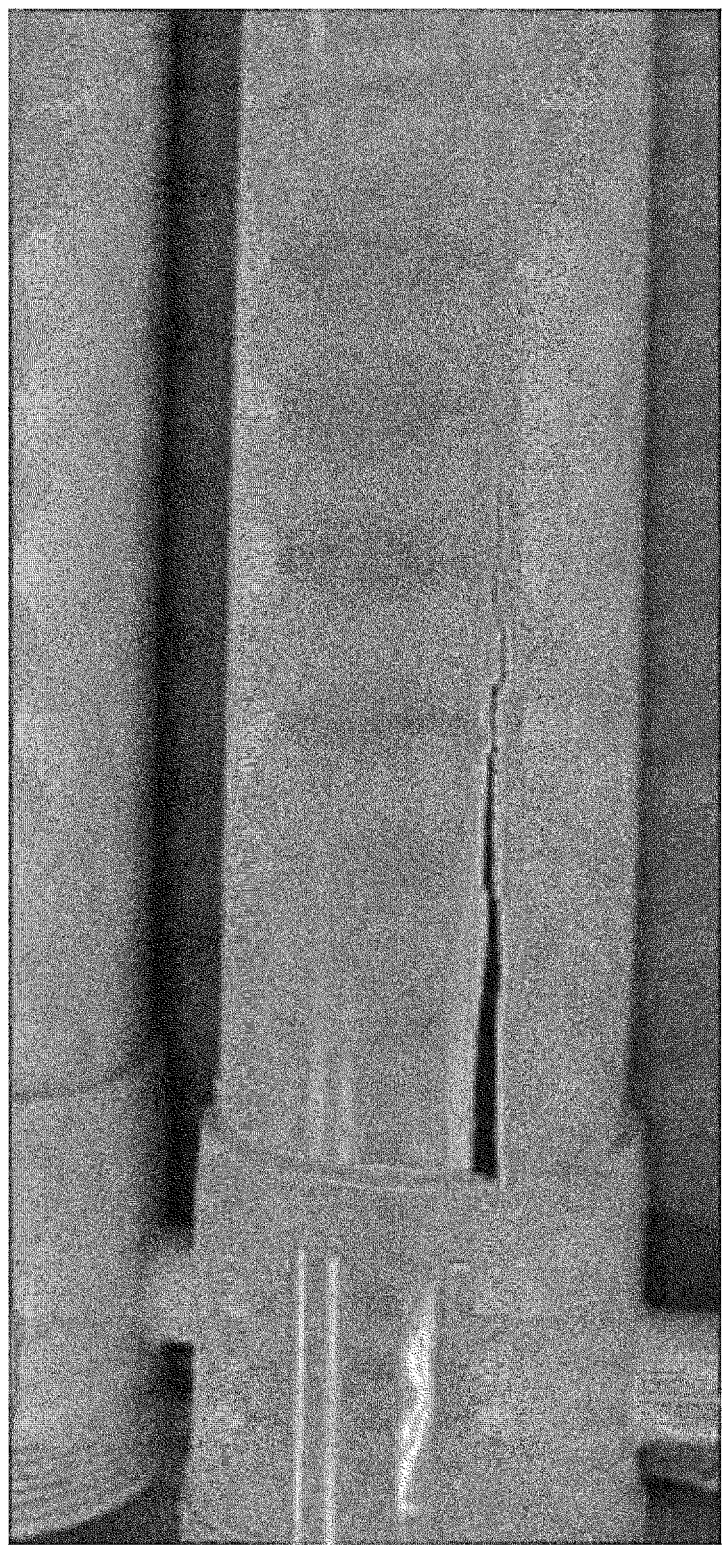
FIG. 16 is an external view of the housing of Comparative Example 2 fractured by the pressure test.
Figure 17:
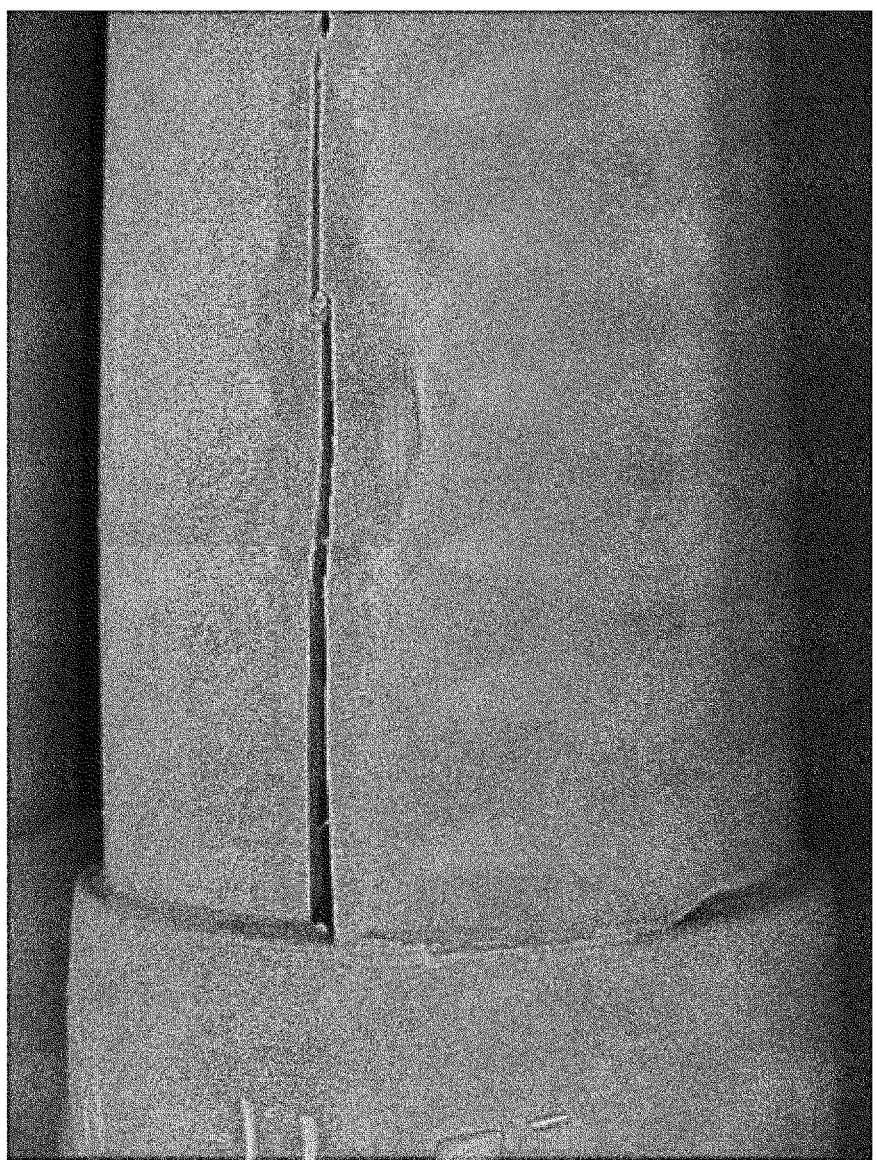
FIG. 17 is an enlarged external view of the housing of Comparative Example 2 fractured by the pressure test.

The same ABS resin pipe except that the length was different (1800 mm) from that of Example 2 was prepared. Further, the first molding member illustrated in FIG. 15 was prepared. In FIG. 15, the circle indicated by "R7 mm" is a circle having a radius of 7 mm, which is a distance of the wall thickness of the second molding member from the connecting position between the first molding member and the second molding member. In FIG. 15, the circle indicated by "R21 mm" is a circle having a radius of 21 mm, which is a distance of three times the wall thickness of the second molding member from the connecting position between the first molding member and the second molding member. In FIG. 15, the circle indicated by "R35 mm" is a circle having a radius of 35 mm, which is a distance of five times the wall thickness of the second molding member from the connecting position between the first molding member and the second molding member. Unlike the housing case of Example 2 illustrated in FIG. 6, the housing case of Comparative Example 2 was produced by joining the second molding member and the first molding member in a state in which the second molding member is inserted into the lumen of the first molded member. The first molding member and the second molding member were solvent-joined by using a MEK (methyl ethyl ketone) dope adhesive known as a solvent for ABS resin. This dope adhesive was obtained by dissolving and mixing 30 parts by weight of the resin pellets used for the ABS resin (this time, the first molding member) in MEK. The first molding member and the second molding member were stored in a room air-conditioned to 35° C. and equipped with a ventilation system for 7 days, waited for the solvent to volatilize, heated at 50° C. for 48 hours, and then cooled to room temperature to obtain a housing case having a total length of 2120 mm. When pressure was applied in the same manner as Example 2, fracture occurred at 1.9 [MPa], and the starting point of the fracture was the boundary between the first molding member and the second molding member (see FIGS. 16 and 17).

Reference Example 1

Figure 18:
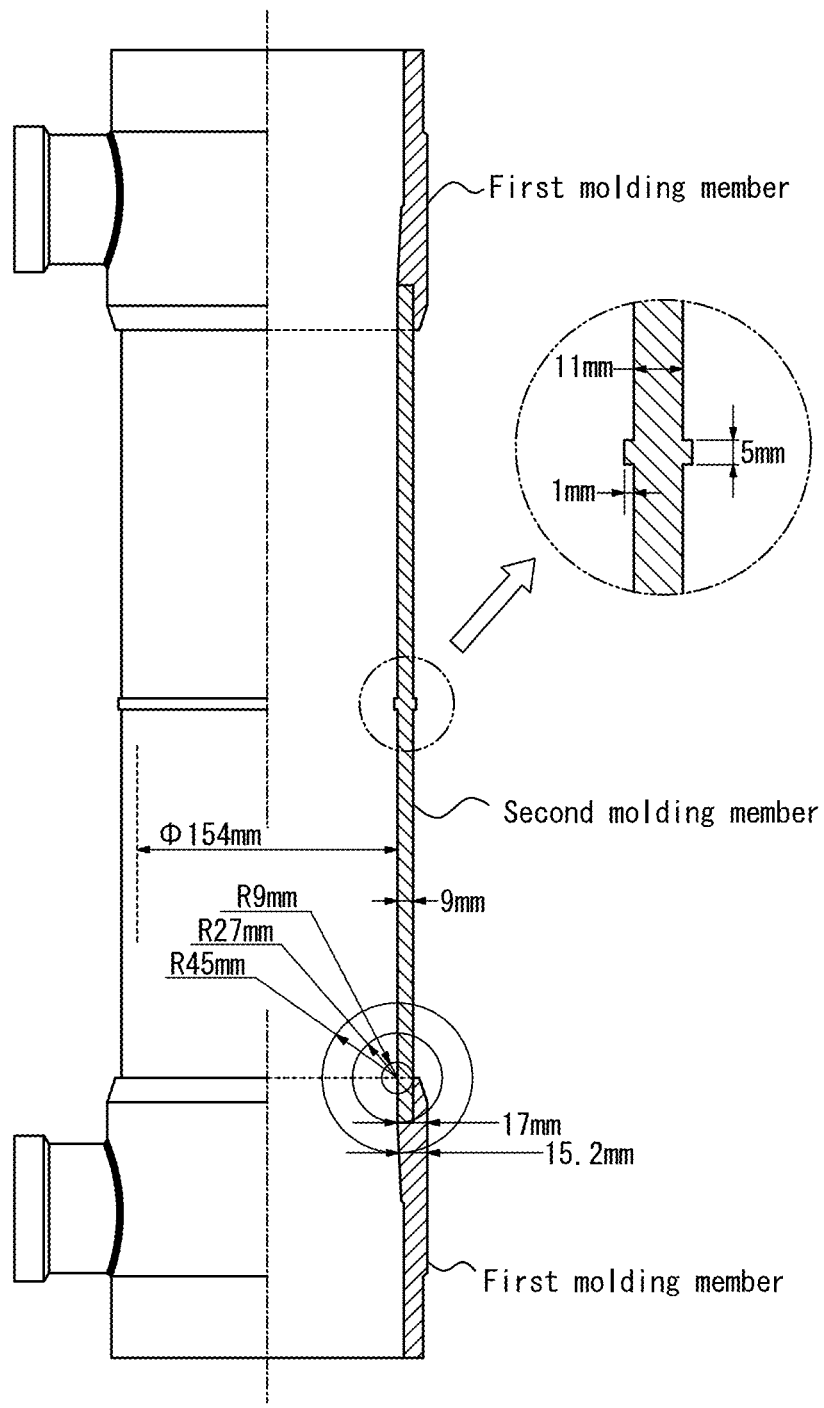
FIG. 18 is a partial half transverse sectional view illustrating dimension of a housing case of Reference Example 1.

As the second molding member, two pieces of pipes (inner diameter: 154 mm, wall thickness: 9 mm) made from polysulfone resin were prepared. The relationship between the inner diameter and the wall thickness of the second molding member was the dimension conforming to the VP pipe of JIS K6741. The end faces thereof were heated by the end face heating apparatus illustrated in FIG. 2 to join them. When a jig to prevent molten resin from protruding out of the inner diameter part and the outer diameter part was placed and heat-joining was carried out, a portion protruding by 1 mm in each of the inner and outer radial directions with respect to the inner diameter of the original second molding member was generated over a length of 5 mm. The heat-joined second molding members were cut to 500 mm, then covered and adhered to each lumen of the first molding member in a pipe shape having a nozzle portion on the side thereof through an epoxy adhesive to obtain a housing case of Reference Example 1 having a total length of 850 mm illustrated in FIG. 18. In FIG. 18, the circle indicated by "R9 mm" is a circle having a radius of 9 mm, which is a distance of the wall thickness of the second molding member from the connecting position between the first molding member and the second molding member. In FIG. 18, the circle indicated by "R27 mm" is a circle having a radius of 27 mm, which is a distance of three times the wall thickness of the second molding member from the connecting position between the first molding member and the second molding member. In FIG. 18, the circle indicated by "R45 mm" is a circle having a radius of 45 mm, which is a distance of five times the wall thickness of the second molding member from the connecting position between the first molding member and the second molding member. After wiping off the protruded adhesive, the housing case was heated and held in a 40° C. atmosphere for 48 hours and in a 90° C. atmosphere for 20 hours to further accelerate curing of the epoxy adhesive.

Figure 19:
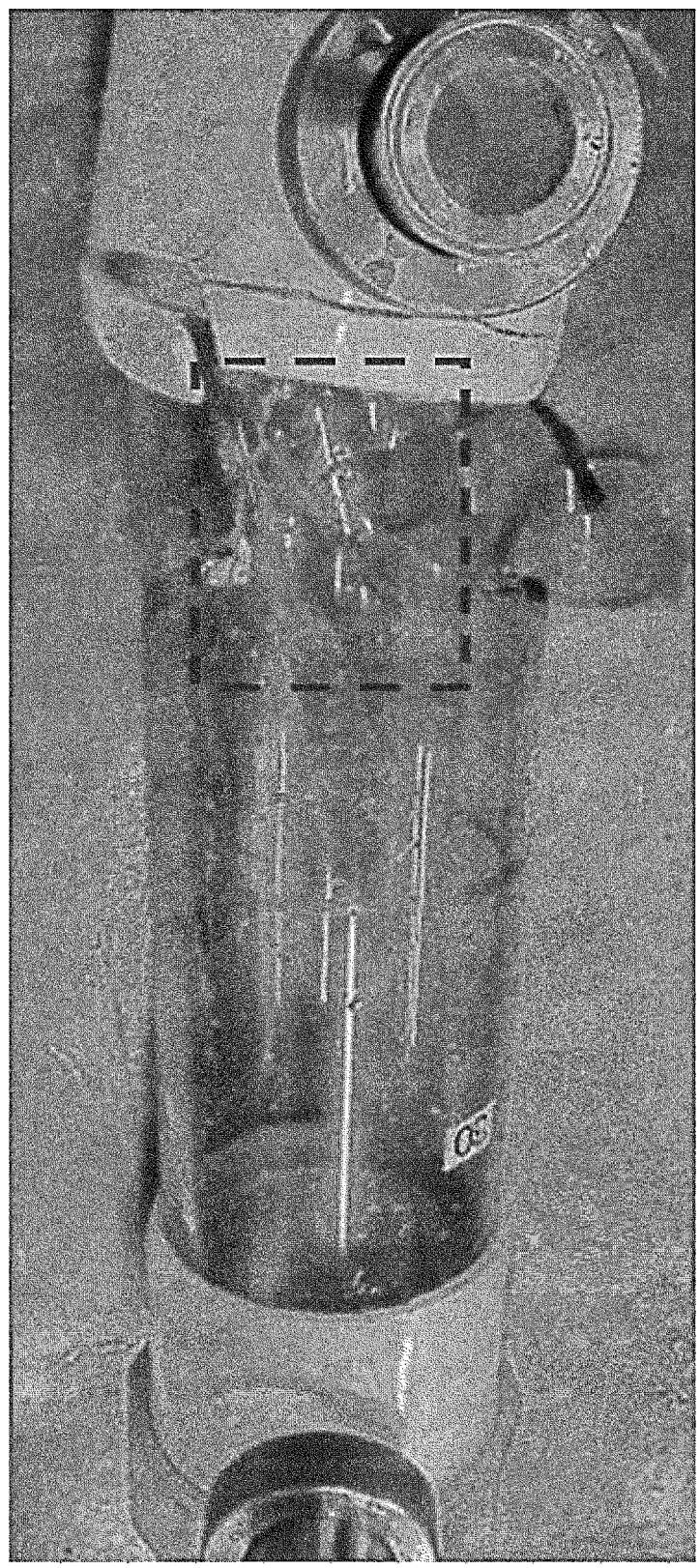
FIG. 19 is an external view of the housing of Reference Example 1 fractured by the pressure test.
Figure 20:
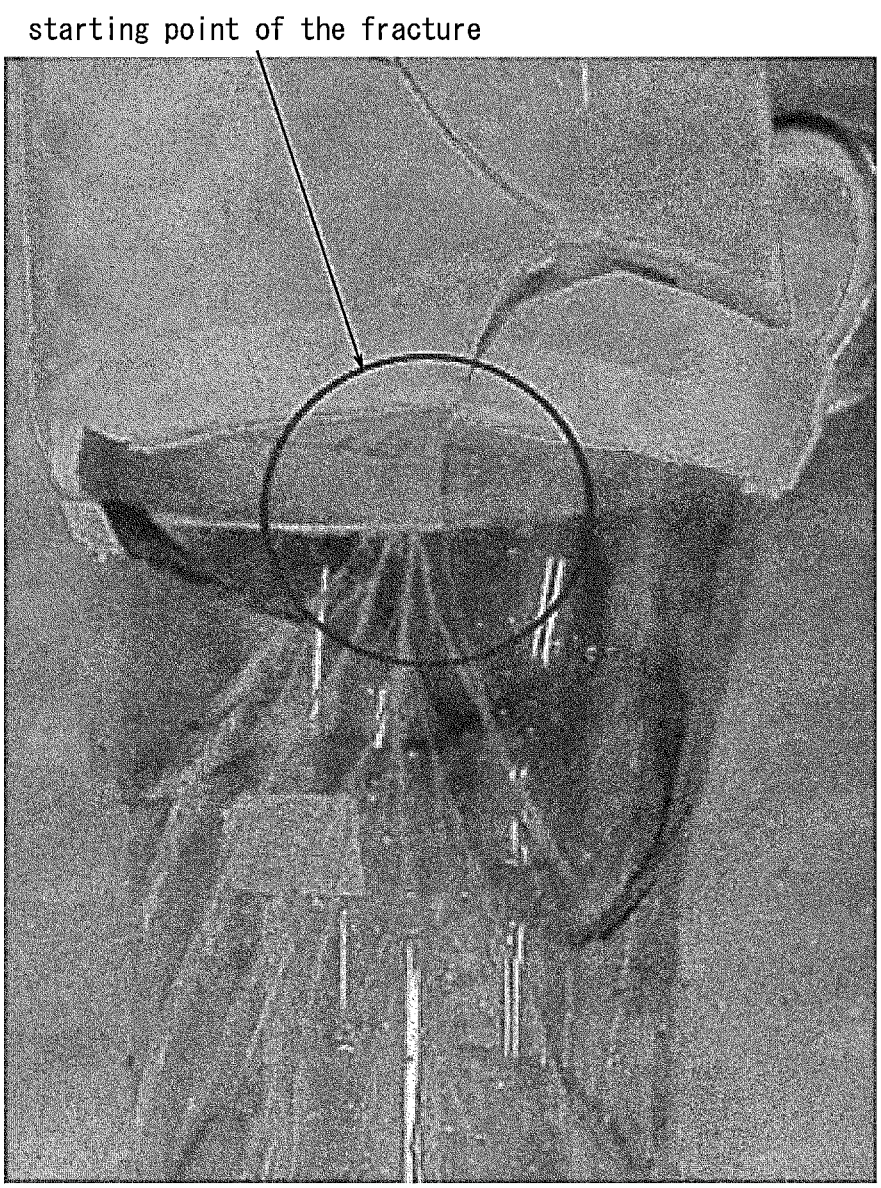
FIG. 20 is an enlarged external view in the vicinity of the dashed line in FIG. 19, viewed from another perspective.
Figure 21:
FIG. 21 is an enlarged external view in the vicinity of a heated joint portion of a second molding member of a housing of Reference Example 1 fractured by the pressure test.

When pressure was applied to the housing case of Reference Example 1 produced in the manner described above, the housing case was fractured at 4.1 [MPa]. Radial cracks centered on the boundary between the second molding member and the first molding member were observed, indicating that the boundary portion was a starting point of the fracture. Furthermore, the heat-bonded portion between the second molding members was fractured at the extension line of the above described starting point, and it was confirmed that it was not the starting point (see FIGS. 19, 20 and 21).

Reference Example 2

Figure 22:
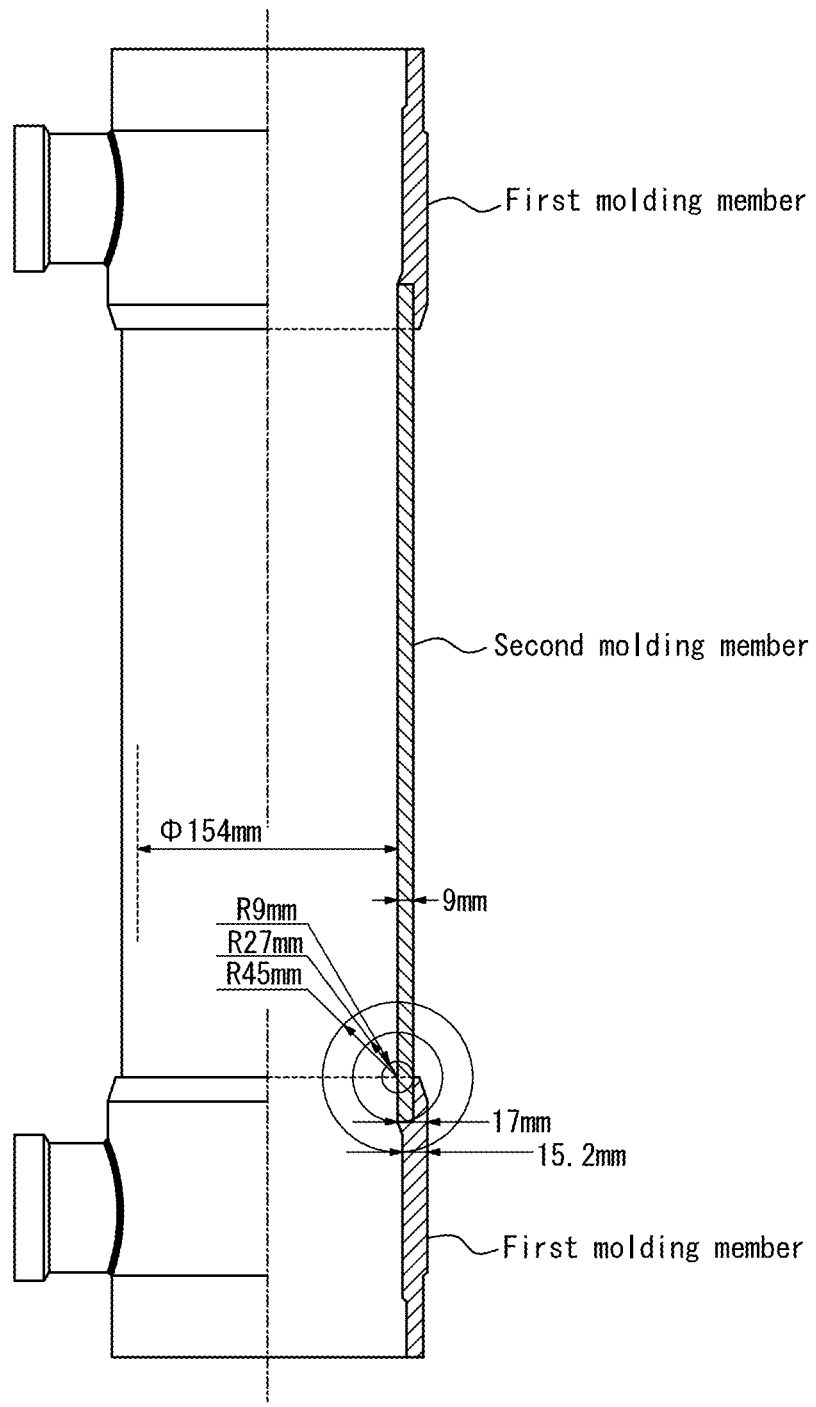
FIG. 22 is a partial half transverse sectional view illustrating dimension of a housing case of Reference Example 2.
Figure 23:
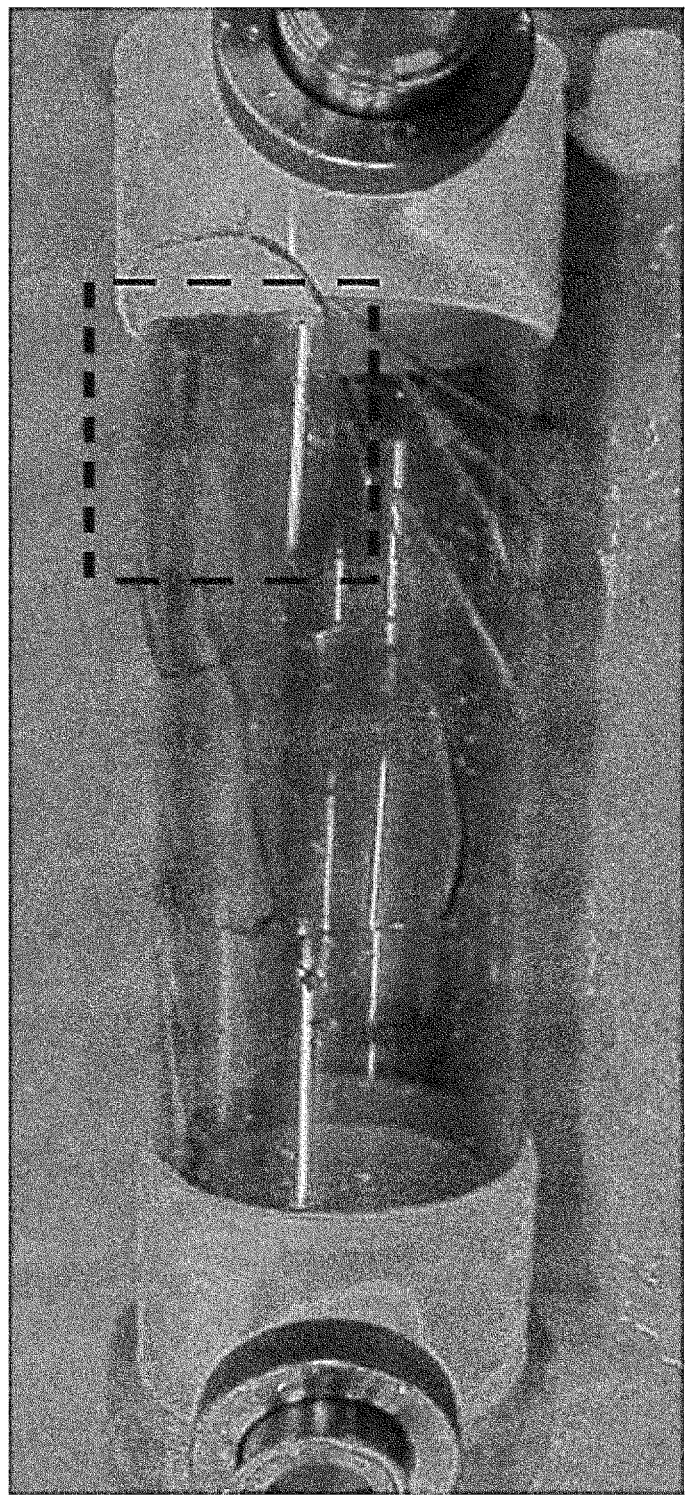
FIG. 23 is an external view of the housing of Reference Example 1 fractured by the pressure test.
Figure 24:
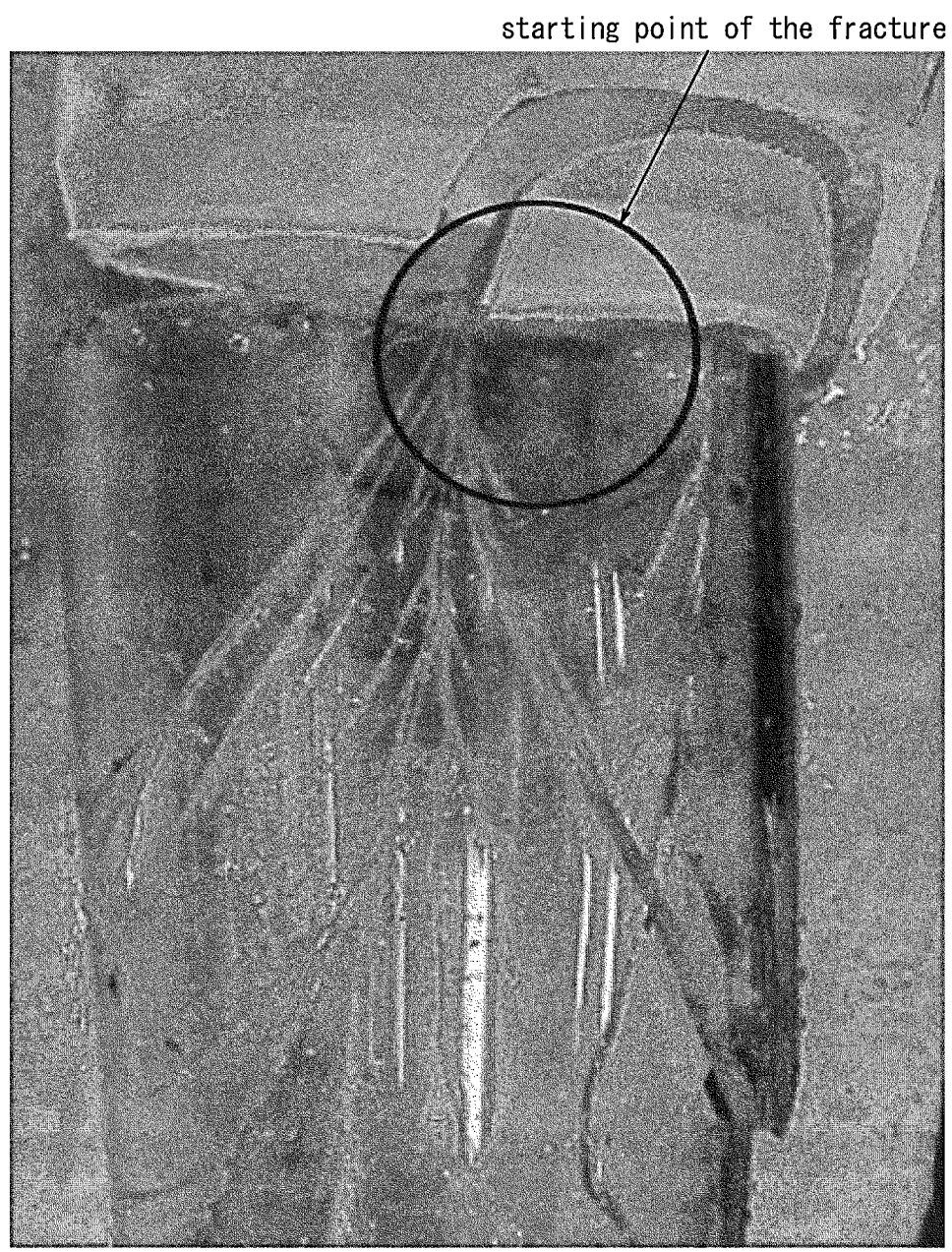
FIG. 24 is an enlarged external view in the vicinity of the dashed line in FIG. 23, viewed from another perspective.

A housing case of Reference Example 2 having a total length of 850 mm illustrated in FIG. 22 was prepared in the same manner as Reference Example, except that the pipe is a single pipe not obtained by heating the second molding members to join them. In FIG. 22, the circle indicated by "R9 mm" is a circle having a radius of 9 mm, which is a distance of the wall thickness of the second molding member from the connecting position between the first molding member and the second molding member. In FIG. 22, the circle indicated by "R27 mm" is a circle having a radius of 27 mm, which is a distance of three times the wall thickness of the second molding member from the connecting position between the first molding member and the second molding member. In FIG. 22, the circle indicated by "R45 mm" is a circle having a radius of 45 mm, which is a distance of five times the wall thickness of the second molding member from the connecting position between the first molding member and the second molding member. When pressure was applied to the housing case of Reference Example 2, it was fractured at 3.8 [MPa]. Further, radial cracks centered on the boundary between the second molding member and the first molding member were observed as with Reference Example 1, indicating that the boundary portion was the starting point of the fracture (see FIGS. 23 and 24).

Table 1 shows the dimensions of each member used for the above described Examples, Comparative Examples and Reference Examples and results.

TABLE 1

| | Second molding member | | Wall thickness of housing case Distance from connecting portion [mm] | | Part where fracture occurred | Hydraulic pressure at which fracture occurred [MPa] | Wall thickness ratio (3 times) | Wall thickness ratio (5 times) | | Name of material | Brand name |
|---|---|---|---|---|---|---|---|---|---|---|---|
| | Wall thickness [mm] | Inner diameter [mm] | 3 times | 5 times | | | | | | | |
| Example 1 | 6.0 | 153.0 | 7.8 | 9.0 | Pipe single part | 3.7 | 1.30 | 1.50 | Equivalent to VU pipe | ABS | AE151/IM-10 |
| Comparative Example 1 | 6.0 | 153.0 | 15.8 | 14.7 | Boundary between second member and first member | 2.9 | 2.63 | 2.45 | Equivalent to VU pipe | ABS | AE151/IM-10 |
| Example 2 | 7.0 | 202.0 | 8.8 | 10.1 | Pipe single part | 3.2 | 1.26 | 1.44 | Equivalent to VU pipe | ABS | AE15P/IM15P |
| Comparative Example 2 | 7.0 | 202.0 | 19.1 | 20.4 | Boundary between second member and first member | 1.9 | 2.73 | 2.91 | Equivalent to VU pipe | ABS | AE15P/IM15P |
| Example 3 | 7.0 | 202.0 | 7.7 | 8.2 | Thread portion at the outer end of second member | 2.6 | 1.10 | 1.17 | Equivalent to VU pipe | ABS | AE15P/IM15P |
| Reference Example 1 | 9.0 | 154.0 | 15.2 | 17.0 | Boundary between second member and first member | 5.6 | 1.69 | 1.89 | Equivalent to VU pipe | PSF | udel P1700/P1710 |
| Reference Example 2 | 9.0 | 154.0 | 15.2 | 17.0 | Boundary between second member and first member | 5.4 | 1.69 | 1.89 | Equivalent to VU pipe | PSF | udel P1700/P1710 |

REFERENCE SIGNS LIST

10 Hollow fiber membrane module
11 Hollow fiber membrane bundle
12 Potting material
13 Module case
14 Hollow fiber membrane
15 Housing case
16 Cap member
17 First molding member
18 Second molding member
19 Tubular portion
20 Nozzle portion
21 Nut
22 O-ring
23 Conduit
24 Heater
es End face

The invention claimed is:

1. A hollow fiber membrane module, comprising:
a hollow fiber membrane bundle configured by bundling a plurality of hollow fiber membranes; and
a housing case that has a first molding member formed by integrally molding a tubular portion and a nozzle portion with a lumen communicated with the tubular portion and a tubular second molding member coaxially continuous with the tubular portion and accommodates the hollow fiber membrane bundle, wherein
a total length of the housing case in an axial direction exceeds 1 m; and
values obtained by dividing, by a wall thickness of the second molding member, wall thicknesses of the first molding member at positions separated from a connecting position between the first molding member and the second molding member toward the first molding member side by distances of 3 times and 5 times the wall thickness of the second molding member in the axial direction are 1.10 to 1.3 and 1.17 to 1.5, respectively.

2. The hollow fiber membrane module according to claim 1, wherein the second molding member has a cylindrical shape with an inner diameter of 150 mm or more.

3. The hollow fiber membrane module according to claim 2, wherein the second molding member has a cylindrical shape with an inner diameter of 200 mm or more.

4. The hollow fiber membrane module according to claim 1, wherein fracture occurs, due to pressurization inside the housing case, from a part other than the connecting position as a starting point.

5. The hollow fiber membrane module according to claim 1, wherein the first molding member and the second molding member are molded by a resin material selected from at least one of ABS resin, polyvinyl chloride, polyphenylene ether, polypropylene, polysulfone, polyethersulfone, and polyphenylene sulfide.

6. The hollow fiber membrane module according to claim 1, wherein the first molding member and the second molding member are molded by the same resin material.

7. The hollow fiber membrane module according to claim 1, wherein at least one of the first molding member and the second molding member is molded by a resin material mixed with glass fiber.

8. A manufacturing method of the hollow fiber membrane module according to claim 1, wherein the method comprising forming the housing case by butt-joining the first molding member and the second molding member.

9. The manufacturing method according to claim 8, comprising joining the first molding member and the second molding member by any one of heating, contact heating and organic solvent.

* * * * *